United States Patent
Hwang et al.

(10) Patent No.: US 11,337,194 B2
(45) Date of Patent: *May 17, 2022

(54) METHOD AND USER EQUIPMENT FOR PERFORMING UPLINK TRANSMISSION

(71) Applicant: LG Electronics Inc., Seoul (KR)

(72) Inventors: Daesung Hwang, Seoul (KR); Suckchel Yang, Seoul (KR); Seungmin Lee, Seoul (KR)

(73) Assignee: LG Electronics Inc., Seoul (KR)

(*) Notice: Subject to any disclaimer, the term of this patent is extended or adjusted under 35 U.S.C. 154(b) by 78 days.

This patent is subject to a terminal disclaimer.

(21) Appl. No.: 17/004,716

(22) Filed: Aug. 27, 2020

(65) Prior Publication Data
US 2020/0396732 A1 Dec. 17, 2020

Related U.S. Application Data

(63) Continuation of application No. 16/879,452, filed on May 20, 2020, now Pat. No. 10,834,713, which is a continuation of application No. 16/585,986, filed on Sep. 27, 2019, now Pat. No. 10,750,485, which is a continuation of application No. 15/746,236, filed as application No. PCT/KR2016/008837 on Aug. 11, 2016, now Pat. No. 10,624,068.

(Continued)

(51) Int. Cl.
*H04W 72/04* (2009.01)
*H04L 27/26* (2006.01)
*H04L 5/00* (2006.01)

(52) U.S. Cl.
CPC ....... *H04W 72/0413* (2013.01); *H04L 5/0048* (2013.01); *H04L 5/0051* (2013.01); *H04L 5/0055* (2013.01); *H04L 27/26* (2013.01)

(58) Field of Classification Search
None
See application file for complete search history.

(56) References Cited

U.S. PATENT DOCUMENTS

| | | | |
|---|---|---|---|
| 10,264,535 B2 | 4/2019 | Kwak et al. | |
| 10,367,620 B2 | 7/2019 | Lyer et al. | |

(Continued)

FOREIGN PATENT DOCUMENTS

| | | |
|---|---|---|
| CN | 102404854 | 4/2012 |
| CN | 102413572 | 4/2012 |

(Continued)

OTHER PUBLICATIONS

3GPP TS 36.211 V10.4.0 {Dec. 2011}; 3rd Generation Partnership Project; Technical Specification Group Radio Access Network; Evolved Universal Terrestrial Radio Access (E-UTRA); Physical Channels and L Modulation {Release 10); pp. 1-101.

(Continued)

*Primary Examiner* — Hassan A Phillips
*Assistant Examiner* — Gautam Sharma
(74) *Attorney, Agent, or Firm* — Fish & Richardson P.C.

(57) ABSTRACT

A disclosure of the present specification provides a new PUCCH format for allowing increased UCI HARQ-ACK; including CSI to be transmitted in an environment in which an enhanced carrier aggregation technology is used so that cells, the number of which exceeds five and is a maximum of X e.g., 32, can be aggregated.

20 Claims, 17 Drawing Sheets

Related U.S. Application Data

(60) Provisional application No. 62/251,657, filed on Nov. 5, 2015, provisional application No. 62/238,719, filed on Oct. 8, 2015, provisional application No. 62/221,090, filed on Sep. 20, 2015, provisional application No. 62/207,938, filed on Aug. 21, 2015, provisional application No. 62/203,916, filed on Aug. 12, 2015.

(56) References Cited

U.S. PATENT DOCUMENTS

| | | | |
|---|---|---|---|
| 2011/0085516 | A1 | 4/2011 | Pajukoski et al. |
| 2012/0057449 | A1* | 3/2012 | Takaoka ............... H04B 1/713 370/210 |
| 2012/0218882 | A1 | 8/2012 | Ko et al. |
| 2012/0327916 | A1 | 12/2012 | Ahn et al. |
| 2013/0176982 | A1 | 7/2013 | Han et al. |
| 2014/0050181 | A1 | 2/2014 | Tiirola et al. |
| 2014/0211747 | A1 | 7/2014 | Takeda et al. |
| 2014/0219202 | A1 | 8/2014 | Kim et al. |
| 2015/0016239 | A1 | 1/2015 | Yi et al. |
| 2016/0028572 | A1 | 1/2016 | Suzuki et al. |
| 2016/0191221 | A1* | 6/2016 | Fukuta ............ H04W 72/0413 370/329 |
| 2016/0269939 | A1 | 9/2016 | Papasakellariou |
| 2017/0142702 | A1 | 5/2017 | Yu et al. |
| 2017/0155488 | A1 | 6/2017 | Saxena et al. |
| 2017/0295570 | A1 | 10/2017 | Awad et al. |
| 2018/0092101 | A1 | 3/2018 | Xia et al. |
| 2018/0167129 | A1 | 6/2018 | Aiba et al. |
| 2018/0198568 | A1 | 7/2018 | Takeda et al. |
| 2018/0213513 | A1 | 7/2018 | Sun et al. |
| 2018/0227838 | A1 | 8/2018 | Hayashi et al. |
| 2018/0241453 | A1 | 8/2018 | Lee et al. |
| 2018/0317220 | A1 | 11/2018 | Takahashi et al. |
| 2019/0045552 | A1 | 2/2019 | Blankenship et al. |

FOREIGN PATENT DOCUMENTS

| | | |
|---|---|---|
| CN | 104137461 | 11/2014 |
| CN | 104753647 | 7/2015 |
| EP | 2437401 | 4/2012 |
| KR | 20120022933 | 3/2012 |
| WO | WO2013/125839 | 8/2013 |
| WO | WO2015019900 | 2/2015 |

OTHER PUBLICATIONS

Huawei et al., "New PUCCH format design to support UCI transmission for up to 32 component carriers", R·,-152462, 3GPP TSG RAN WG1 Meeting #81, Fukuoka, Japan, May 25-29, 2015, See sections 2, 3.

InterDigital Communications, LLC, "OM-RS for UL CoMP", 3GPP TSG-RAN WG1 Meeting #68bis, R1-121314, Jeju, Korea, Mar. 26-30, 2012, 6 pages.

LG Electronics, "HARQ-ACK PUC CH transmission for Rel-13 CA", R1-152717, 3GPP TSG RAN WG1 Meeting #81, Fukuoka, Japan, May 25-29, 2015, See sections 2.1-2.3.

Nokia Networks, "On New PUCCH Format Design for Carrier Aggregation Enhancement Beyond 5 Carriers", R'1-151837, 3GPP TSG-RAN WG1 Meeting #80bis, Belgrade, Serbia, Apr. 20-24, 2015, See section 2.

NTT Docomo, Inc., "Discussion on ttle new PUCCH format for up to 32 CCs", R1-153194, 3GPP TSG RAN WG1 Meeting #81, Fukuoka, Japan, May 25-29, 2015, See pp. 1-3.

Extended European Search Report in European Appln. No. 21179582. 8, dated Oct. 12, 2021, 10 pages.

LG Electronics, "Design issues on PUCCH for MTC UE," R1-151491, Presented at 3GPP TSG RAN WG1 Meeting #80bis, Belgrade, Serbia, Apr. 20-24, 2015, 4 pages.

Nokia Networks, "On PUCCH Enhancements for Carrier Aggregation Enhancement Beyond 5 Carriers," R1-152809, Presented at 3GPP TSG-RAN WG1 Meeting #81, Fukuoka, Japan, May 25-29 Apr. 2015, 4 pages.

* cited by examiner

DM-RS

METHOD AND USER EQUIPMENT FOR PERFORMING UPLINK TRANSMISSION

CROSS-REFERENCE TO RELATED APPLICATIONS

This application is a continuation of U.S. application Ser. No. 16/879,452, filed on May 20, 2020, now allowed, which is a continuation of U.S. application Ser. No. 16/585,986, filed on Sep. 27, 2019, now U.S. Pat. No. 10,750,485, which is a continuation of U.S. application Ser. No. 15/746,236, filed on Jan. 19, 2018, now U.S. Pat. No. 10,624,068, which is a National Stage under U.S.C. § 371 of Internal Application No. PCT/KR2016/008837, filed on Aug. 11, 2016, which claims priority to U.S. Provisional Application No. 62/251,657, filed on Nov. 5, 2015, 62/238,719 filed on Oct. 8, 2015, 62/221,090 filed on Sep. 20, 2015, 62/207,938 filed on Aug. 21, 2015 and 62/203,916 filed on Aug. 12, 2015. The disclosures of the prior applications are incorporated by reference in their entirety.

BACKGROUND OF THE INVENTION

Field of the Invention

The present invention relates to mobile communication.

Related Art

3GPP 3rd Generation Partnership Project LTE Long Term Evolution that is an advancement of UMTS Universal Mobile Telecommunication System is being introduced with 3GPP release 8. In 3GPP LTE, OFDMA orthogonal frequency division multiple access is used for downlink, and SC-FDMA single carrier-frequency division multiple access is used for uplink. The 3GPP LTE adopts MIMO multiple input multiple output having maximum four antennas. Recently, a discussion of 3GPP LTE-A LTE-Advanced which is the evolution of the 3GPP LTE is in progress.

As set forth in 3GPP TS 36.211 V10.4.0, the physical channels in 3GPP LTE may be classified into data channels such as PDSCH physical downlink shared channel and PUSCH physical uplink shared channel and control channels such as PDCCH physical downlink control channel, PCFICH physical control format indicator channel, PHICH physical hybrid-ARQ indicator channel and PUCCH physical uplink control channel.

In order to cope with the increasing amount of data, LTE-Advanced proposed a carrier aggregation (CA) technique that aggregates up to five carriers.

However, the amount of data is rapidly increasing day by day, and it is under discussion to aggregate more than five carriers in the next generation mobile communication system.

However, when aggregating more than five carriers in this way, more bits need to be transmitted on the PUCCH. However, up to now, there is a problem that only hybrid automatic repeat request (HARQ) ACK (acknowledgment)/NACK (non-acknowledgment) up to 20 bits can be transmitted on the PUCCH.

Accordingly, the disclosure of the specification has been made in an effort to solve the problem.

SUMMARY OF THE INVENTION

In order to achieve the above object, one embodiment of the present disclosure provides that in an environment using an enhanced carrier aggregation technique to aggregate up to X cells (e.g. 32 cells) in excess of five cells, a new PUCCH format configured to transmit the increased UCI (including HARQ-ACK and CSI) is suggested.

The new PUCCH format may include one demodulation reference signal (DMRS) symbol per slot, like a PUSCH, to allow more UCIs to be transmitted in an RB (resource block). Therefore, the legacy DMRS also needs a new design.

To achieve the foregoing purposes, the disclosure of the present invention proposes a method for performing uplink transmission. The method may be performed by a user equipment (UE) and comprise: receiving a parameter used to generate a demodulation reference signal (DMRS) for physical shared channel (PUSCH); generating a DMRS for physical uplink control channel (PUCCH) by using the same parameter as being used to generate the DMRS for the PUSCH; and transmitting the DMRS for the PUCCH.

The method may further comprise: mapping the DMRS for the PUCCH onto 1 symbol per a slot.

The parameter may be used for a cyclic shift.

The generating of the DMRS for the PUCCH may include: generating a sequence for the DMRS; and cyclically shifting the sequence by using the same parameter as being used to generate the DMRS for the PUSCH.

The PUCCH may include a hybrid automatic repeat request (HARQ) acknowledgement/negative-acknowledgement (ACK/NACK) signal.

The parameter may be received through a radio resource control (RRC) message.

To achieve the foregoing purposes, the disclosure of the present invention proposes a user equipment (UE) for performing uplink transmission. The UE may comprise: a receiver configured to receive a parameter used to generate a demodulation reference signal (DMRS) for physical shared channel (PUSCH); a processor configured to generate a DMRS for physical uplink control channel (PUCCH) by using the same parameter as being used to generate the DMRS for the PUSCH; and a transceiver configured to transmit the DMRS for the PUCCH.

According to the disclosure of the present specification, the problems of the above-described prior art are solved.

DESCRIPTION OF EXEMPLARY EMBODIMENTS

Figure 1:
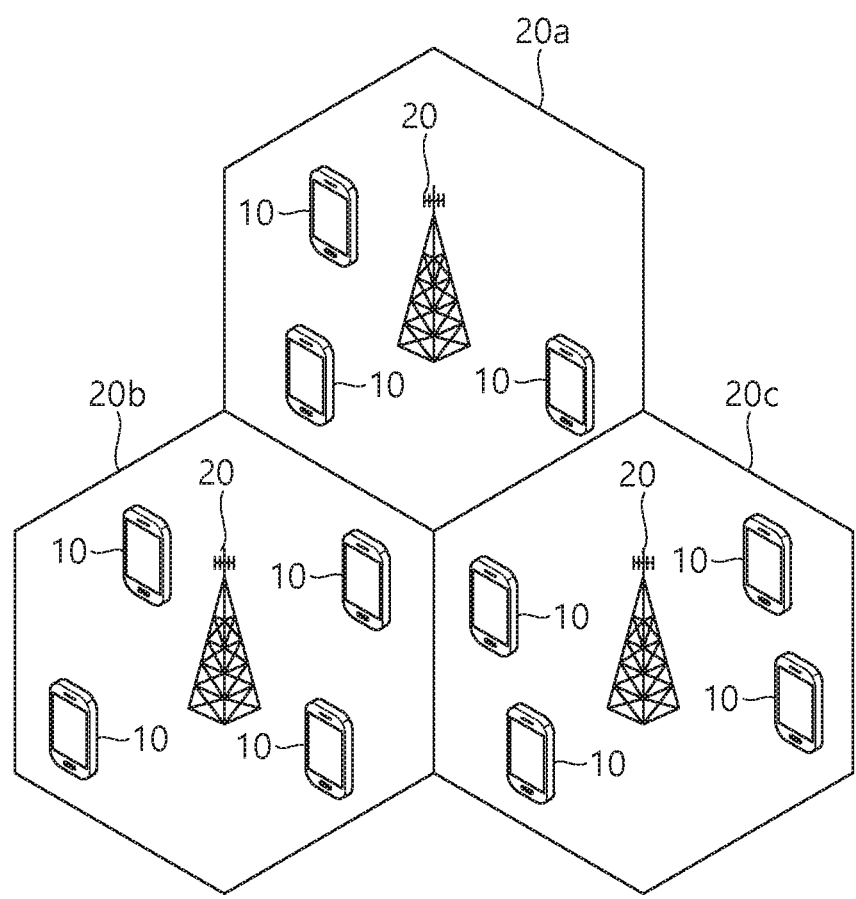
FIG. 1 illustrates a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, user equipment (UE) may be stationary or mobile, and may be denoted by other terms such as device, wireless device, terminal, MS (mobile station), UT (user terminal), SS (subscriber station), MT (mobile terminal) and etc.

FIG. 1 illustrates a wireless communication system.

As seen with reference to FIG. 1, the wireless communication system includes at least one base station (BS) 20. Each base station 20 provides a communication service to specific geographical areas (generally, referred to as cells) 20*a*, 20*b*, and 20*c*. The cell can be further divided into a plurality of areas (sectors).

The UE generally belongs to one cell and the cell to which the terminal belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the UEl 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a sub-frame, the uplink transmission and the downlink transmission are performed in different sub-frames.

Hereinafter, the LTE system will be described in detail.

Figure 2:
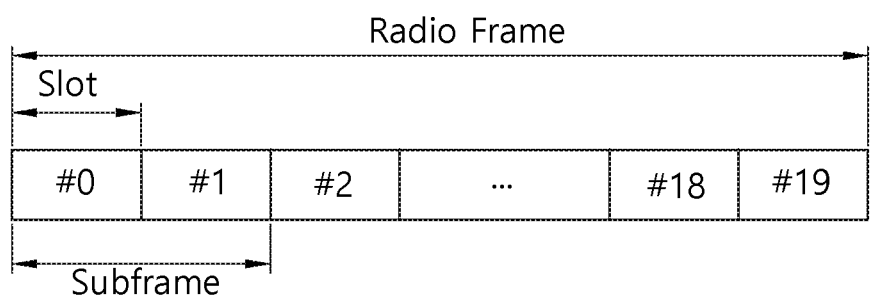
FIG. 2 illustrates the architecture of a radio frame according to frequency division duplex FDD of 3rd generation partnership project 3GPP long term evolution LTE.

FIG. 2 shows a downlink radio frame structure according to FDD of 3rd generation partnership project (3GPP) long term evolution (LTE).

The radio frame of FIG. 2 may be found in the section 5 of 3GPP TS 36.211 V10.4.0 (2011-12) "Evolved Universal Terrestrial Radio Access (E-UTRA); Physical Channels and Modulation (Release 10)".

Referring to FIG. 2, the radio frame consists of 10 subframes. One subframe consists of two slots. Slots included in the radio frame are numbered with slot numbers 0 to 19. A time required to transmit one subframe is defined as a transmission time interval (TTI). The TTI may be a scheduling unit for data transmission. For example, one radio frame may have a length of 10 milliseconds (ms), one subframe may have a length of 1 ms, and one slot may have a length of 0.5 ms.

The structure of the radio frame is for exemplary purposes only, and thus the number of subframes included in the radio frame or the number of slots included in the subframe may change variously.

Meanwhile, one slot may include a plurality of orthogonal frequency division multiplexing (OFDM) symbols. The number of OFDM symbols included in one slot may vary depending on a cyclic prefix (CP). One slot includes 7 OFDM symbols in case of a normal CP, and one slot includes 6 OFDM symbols in case of an extended CP. Herein, since the 3GPP LTE uses orthogonal frequency division multiple access (OFDMA) in a downlink (DL), the OFDM symbol is only for expressing one symbol period in a time domain, and there is no limitation in a multiple access scheme or terminologies. For example, the OFDM symbol may also be referred to as another terminology such as a single carrier frequency division multiple access (SC-FDMA) symbol, a symbol period, etc.

Figure 3:
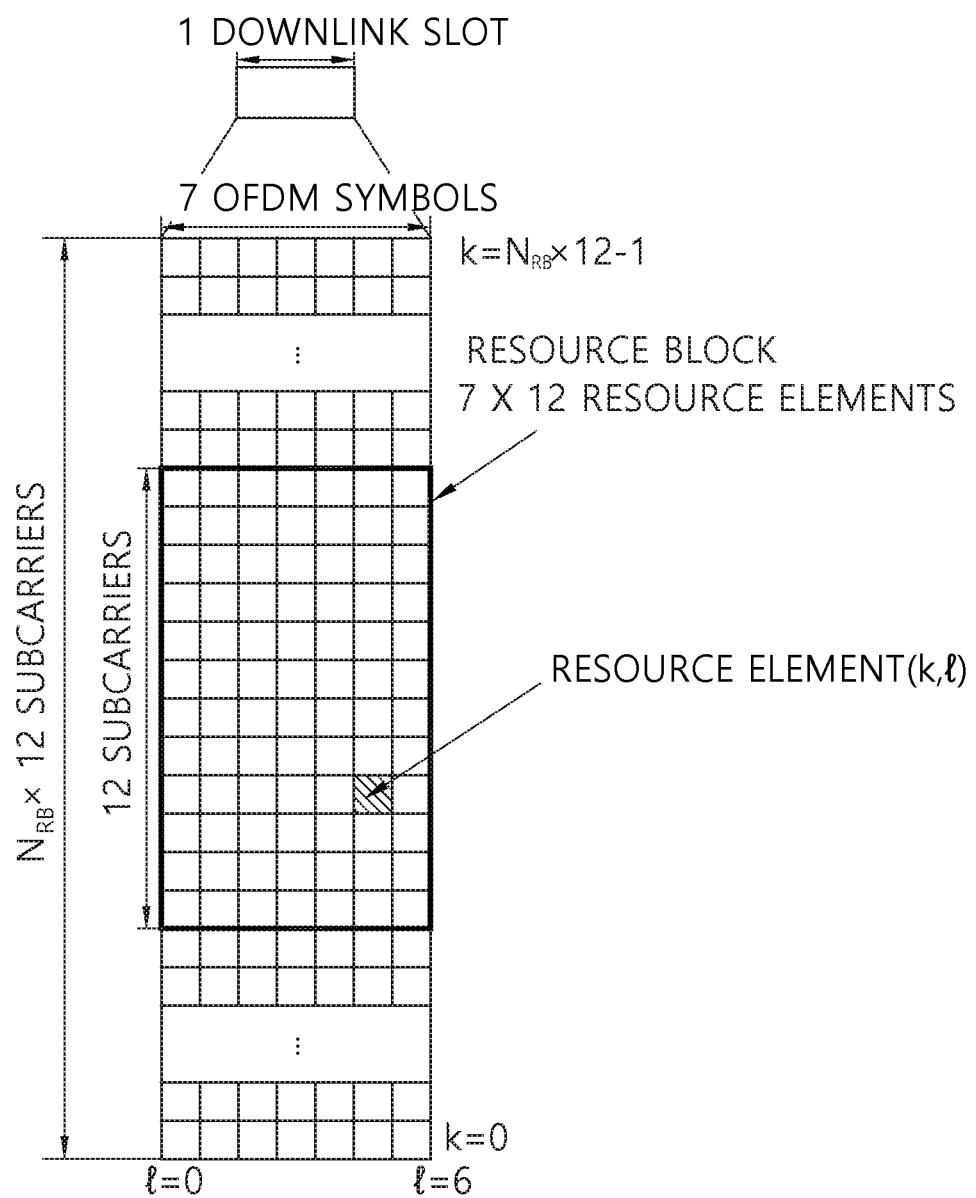
FIG. 3 illustrates the architecture of a downlink radio frame according to time division duplex TDD in 3GPP LTE.

FIG. 3 illustrates an example resource grid for one uplink or downlink slot in 3GPP LTE.

Referring to FIG. 3, the uplink slot includes a plurality of OFDM (orthogonal frequency division multiplexing) symbols in the time domain and NRB resource blocks (RBs) in the frequency domain. For example, in the LTE system, the number of resource blocks (RBs), i.e., $N_{RB}$, may be one from 6 to 110.

Resource block (RB) is a resource allocation unit and includes a plurality of sub-carriers in one slot. For example, if one slot includes seven OFDM symbols in the time domain and the resource block includes 12 sub-carriers in the frequency domain, one resource block may include 7×12 resource elements (REs).

Meanwhile, the number of sub-carriers in one OFDM symbol may be one of 128, 256, 512, 1024, 1536, and 2048.

In 3GPP LTE, the resource grid for one uplink slot shown in FIG. 3 may also apply to the resource grid for the downlink slot.

Figure 4:
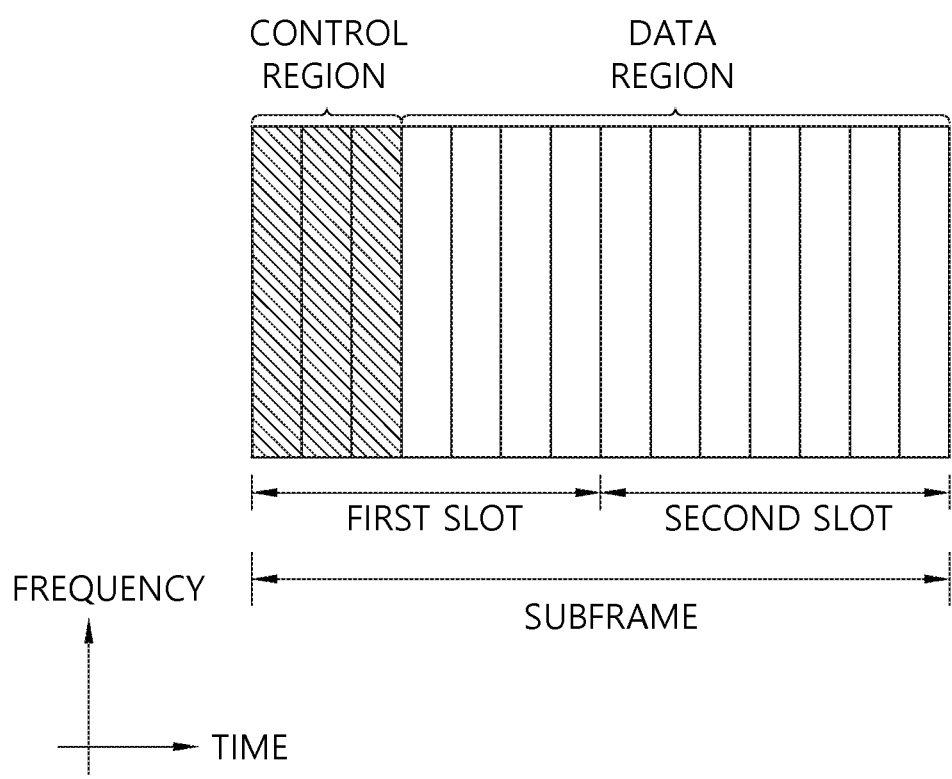
FIG. 4 illustrates an example resource grid for one uplink or downlink slot in 3GPP LTE.

FIG. 4 illustrates the architecture of a downlink sub-frame.

In FIG. 4, assuming the normal CP, one slot includes seven OFDM symbols, by way of example.

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are allocated to the control region, and a PDSCH is allocated to the data region.

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

Figure 5:
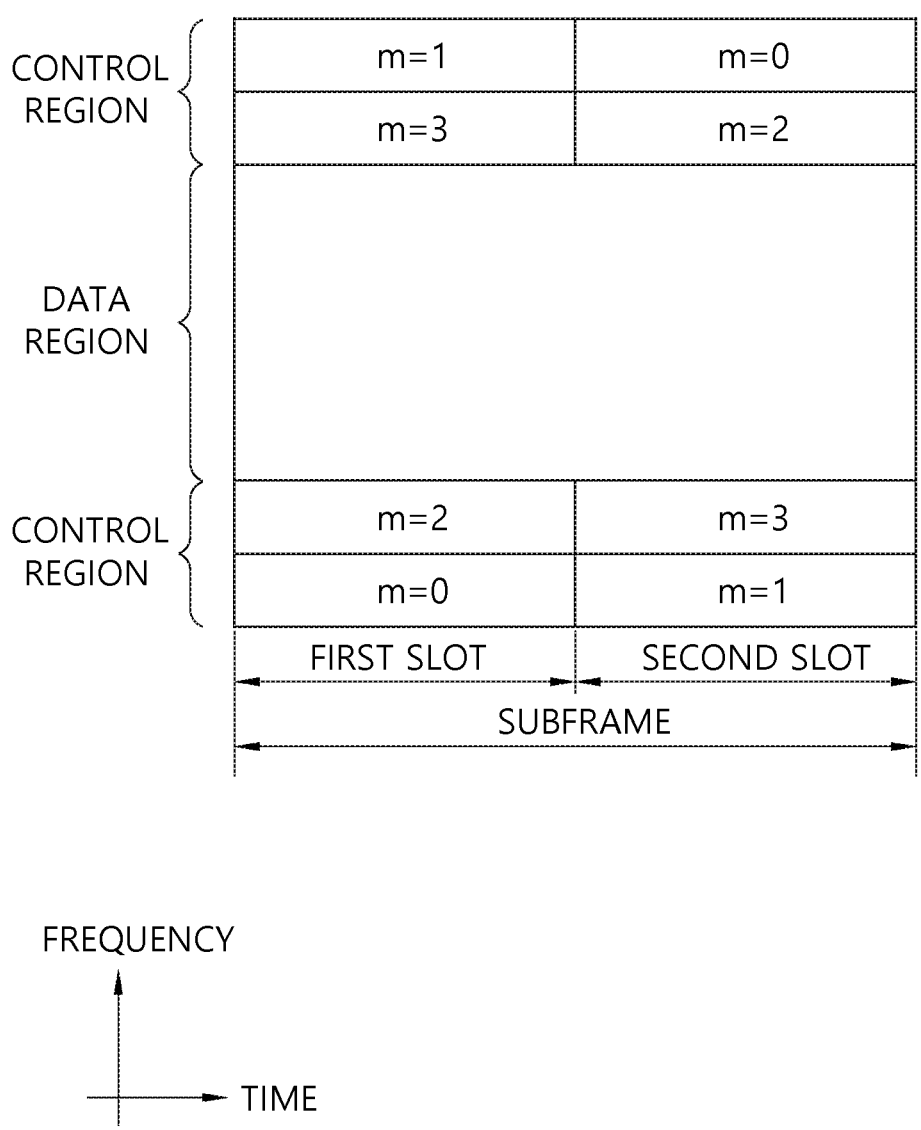
FIG. 5 illustrates the architecture of a downlink subframe.

FIG. 5 illustrates the architecture of an uplink sub-frame in 3GPP LTE.

Referring to FIG. 5, the uplink sub-frame may be separated into a control region and a data region in the frequency domain. The control region is assigned a PUCCH (physical uplink control channel) for transmission of uplink control information. The data region is assigned a PUSCH (physical uplink shared channel) for transmission of data (in some cases, control information may also be transmitted).

The PUCCH for one terminal is assigned in resource block (RB) pair in the sub-frame. The resource blocks in the resource block pair take up different sub-carriers in each of the first and second slots. The frequency occupied by the resource blocks in the resource block pair assigned to the PUCCH is varied with respect to a slot boundary. This is referred to as the RB pair assigned to the PUCCH having been frequency-hopped at the slot boundary.

The terminal may obtain a frequency diversity gain by transmitting uplink control information through different sub-carriers over time. m is a location index that indicates a logical frequency domain location of a resource block pair assigned to the PUCCH in the sub-frame.

The uplink control information transmitted on the PUCCH includes an HARQ (hybrid automatic repeat request), an ACK (acknowledgement)/NACK (non-acknowledgement), a CQI (channel quality indicator) indicating a downlink channel state, and an SR (scheduling request) that is an uplink radio resource allocation request.

The PUSCH is mapped with a UL-SCH that is a transport channel. The uplink data transmitted on the PUSCH may be a transport block that is a data block for the UL-SCH transmitted for the TTI. The transport block may be user information. Or, the uplink data may be multiplexed data. The multiplexed data may be data obtained by multiplexing the transport block for the UL-SCH and control information. For example, the control information multiplexed with the data may include a CQI, a PMI (precoding matrix indicator), an HARQ, and an RI (rank indicator). Or, the uplink data may consist only of control information.

Figure 6:
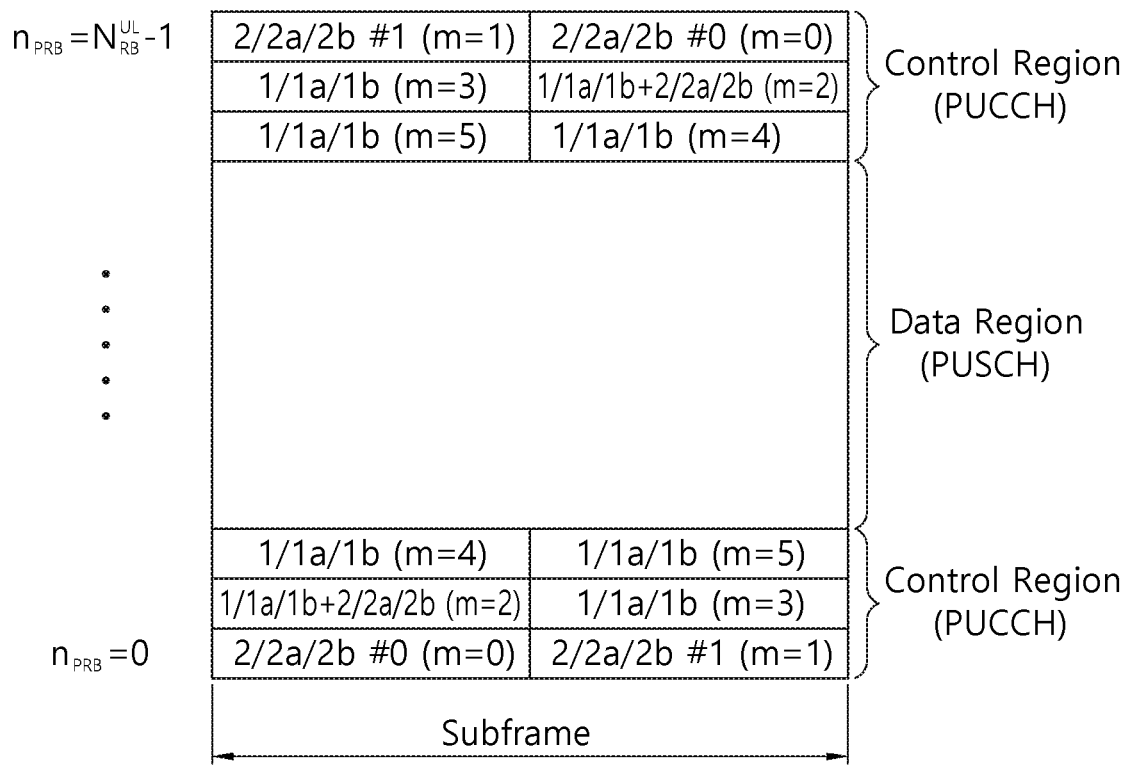
FIG. 6 is an exemplary diagram illustrating a transmission region based on the PUCCH formation.

FIG. 6 illustrates the PUCCH and the PUSCH on an uplink subframe.

PUCCH formats will be described with reference to FIG. 6.

The PUCCH format 1 carries the scheduling request (SR). In this case, an on-off keying (OOK) mode may be applied. The PUCCH format 1a carries acknowledgement/non-acknowledgement (ACK/NACK) modulated in a binary phase shift keying (BPSK) mode with respect to one codeword. The PUCCH format 1b carries ACK/NACK modulated in a quadrature phase shift keying (QPSK) mode with respect to two codewords. The PUCCH format 2 carries a channel quality indicator (CQI) modulated in the QPSK mode. The PUCCH formats 2a and 2b carry the CQI and the ACK/NACK.

A table given below carries the PUCCH formats.

TABLE 1

| Format | Modulation mode | Total bit count per subframe | Description |
|---|---|---|---|
| Format 1 | Undecided | Undecided | Scheduling request (SR) |
| Format 1a | BPSK | 1 | ACK/NACK of 1-bit HARQ, scheduling request (SR) may be present or not present |
| Format 1b | QPSK | 2 | ACK/NACK of 2-bit HARQ, scheduling request (SR) may be present or not present |
| Format 2 | QPSK | 20 | In case of extended CP, CSI and 1-bit or 2-bit HARQ ACK/NACK |
| Format 2a | QPSK + BPSK | 21 | CSI and 1-bit HARQ ACK/NACK |
| Format 2b | QPSK + BPSK | 22 | CSI and 2-bit HARQ ACK/NACK |
| Format 3 | QPSK | 48 | Multiple ACKs/NACKs, CSI, and scheduling request (SR) may be present or not present |

Each PUCCH format is transmitted while being mapped to a PUCCH region. For example, the PUCCH format 2/2a/2b is transmitted while being mapped to resource blocks (m=0 and 1) of band edges assigned to the UE. A mixed PUCCH RB may be transmitted while being mapped to a resource block (e.g., m=2) adjacent to the resource block to which the PUCCH format 2/2a/2b is assigned in a central direction of the band. The PUCCH format 1/1a/1b in which the SR and the ACK/NACK are transmitted may be disposed in a resource block in which m=4 or m=5. The number (N(2)RB) of resource blocks which may be used in the PUCCH format 2/2a/2b in which the CQI is transmitted may be indicated to the UE through a broadcasted signal.

Figure 7A:
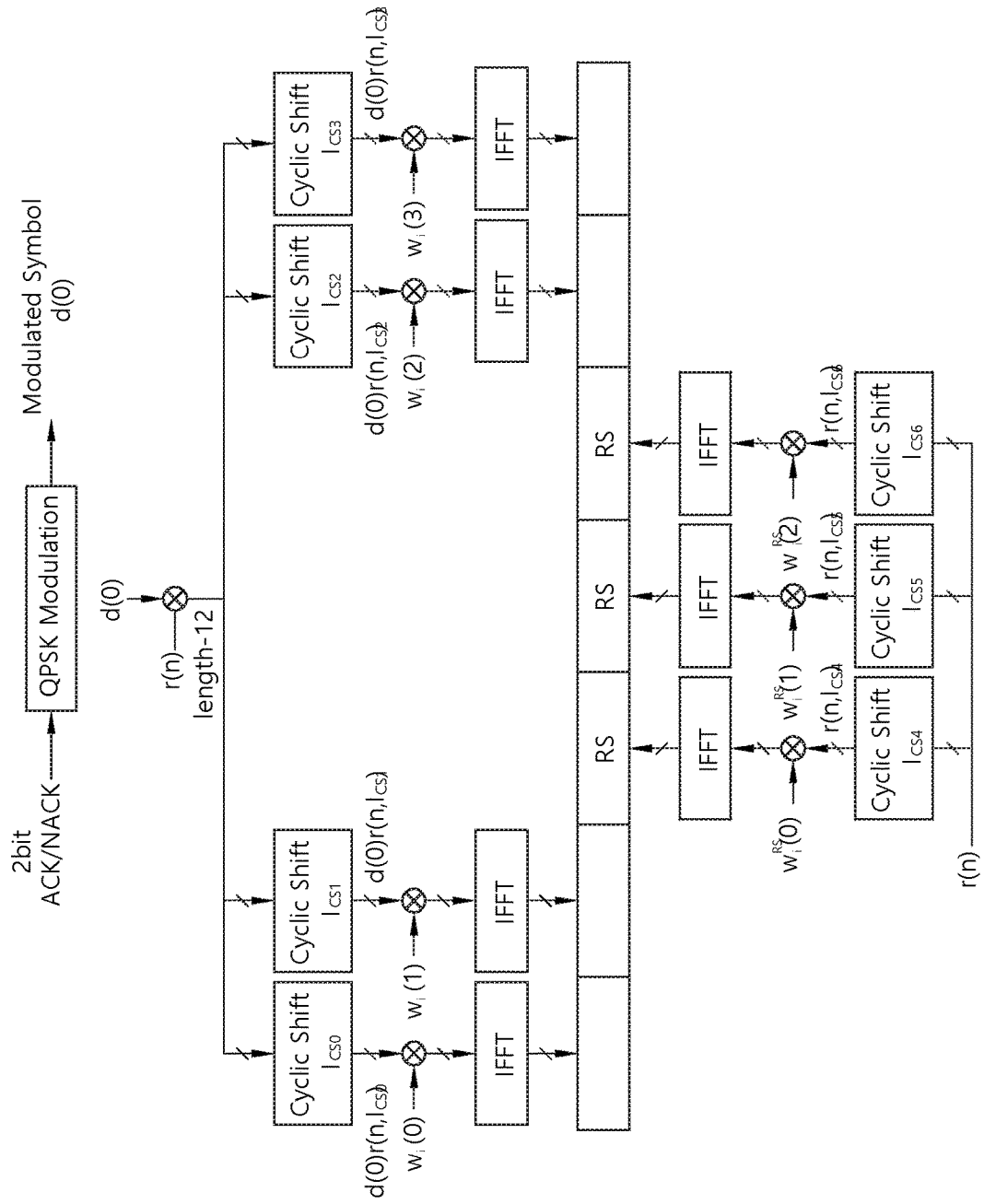
FIG. 7a illustrates a channel structure of PUCCH format 1b in a normal CP.

FIG. 7a illustrates a channel structure of PUCCH format 1b in a normal CP.

One slot includes 7 OFDM symbols, 3 OFDM symbols become OFDM symbol for a reference signal for demodulation, that is, a demodulation reference signal (DMRS), and 4 OFDM symbols become a data OFDM symbol for an ACK/NACK signal.

In the PUCCH format 1b, an encoded 2-bit ACK/NACK signal is quadrature phase shift keying (QPSK)-modulated to generate modulation symbol d(0).

A cyclic shift index $I_{cs}$ may vary depending on a slot number $n_s$ and/or a slot symbol index 1 in the radio frame.

In a normal CP, since 4 data OFDM symbols exist in one slot in order to transmit the ACK/NACK signal, cyclic shift indexes corresponding to respective data OFDM symbols are set as $I_{cs0}$, $I_{cs1}$, $I_{cs2}$, and $I_{cs3}$.

The modulation symbol d(0) is spread to a cyclic shifted sequence $r(n,I_{cs})$. When a 1D spread sequence corresponding to an (i+1)-th OFDM symbol in the slot is m(i), the 1D spread sequence may be expressed as $\{m(0), m(1), m(2), m(3)\}=\{d(0)r(n,I_{cs0}), d(0)r(n,I_{cs1}), d(0)r(n,I_{cs2}), d(0)r(n,I_{cs3})\}$.

In order to increase a UE capacity, the 1D spread sequence may be spread by using an orthogonal sequence. The following sequence is used as an orthogonal $w_i(k)$ (i represents a sequence index, 0≤k≤K−1) in which a spreading factor K is 4.

TABLE 2

| Index (i) | K = 4 | K = 3 |
|---|---|---|
| | [$w_i(0), w_i(1), w_i(2), w_i(3)$] | [$w_i(0), w_i(1), w_i(2)$] |
| 0 | [+1, +1, +1, +1] | [+1, +1, +1] |
| 1 | [+1, −1, +1, −1] | [+1, $e^{j2\pi/3}$, $e^{j4\pi/3}$] |
| 2 | [+1, −1, −1, +1] | [+1, $e^{j4\pi/3}$, $e^{j2\pi/3}$] |

Different spreading factors may be used for each slot.

Therefore, when a predetermined orthogonal sequence index i is given, 2D spread sequences {s(0), s(1), s(2), s(3)} may be expressed as follows.

{s(0), s(1), s(2), s(3)}={$w_i(0)m(0), w_i(1)m(1), w_i(2)m(2), w_i(3)m(3)$}

The 2D spread sequences {s(0), s(1), s(2), s(3)} are transmitted in corresponding OFDM symbols after inverse fast Fourier transform (IFFT) is performed. As a result, the ACK/NACK signal is transmitted onto the PUCCH.

The reference signal of the PUCCH format 1b is transmitted by cyclic-shifting a base sequence r(n) and thereafter, spreading the cyclic-shifted sequence r(n) to the orthogonal sequence. When cyclic shift indexes corresponding to 3 RS OFDM symbols are $I_{cs4}$, $I_{cs5}$, and $I_{cs6}$, 3 cyclic-shifted sequences $r(n,I_{cs4})$, $r(n,I_{cs5})$, and $r(n,I_{cs6})$ may be acquired. 3 cyclic-shifted sequences are spread to an orthogonal sequence $w^{RS}_i(k)$ in which K=3.

An orthogonal sequence index i, a cyclic shift index $I_{cs}$, and a resource block index m are parameters required for configuring the PUCCH and resources used to distinguish the PUCCH (alternatively, UE). When the number of available cyclic shifts is 12 and the number of available orthogonal sequence indexes is 3, the PUCCHs for a total of 36 UEs may be multiplexed to one resource block.

In the 3GPP LTE, a resource index $n^{(1)}_{PUCCH}$ is defined in order for the UE to acquire 3 parameters for configuring the PUCCH. The resource index is defined as $n^{(1)}_{PUCCH}=n_{CCE}+N^{(1)}_{PUCCH}$, and $n_{CCE}$ represents a number of a first CCE used for transmitting a corresponding PDCCH (that is, a PDCCH including downlink resource allocation (DCI) to schedule downlink data corresponding to the ACK/NACK signal) and $N^{(1)}_{PUCCH}$ represents a parameter which the base station announces to the UE as a higher layer message.

Time, frequency, and code resources used for transmitting the ACK/NACK signal are referred to as an ACK/NACK resource or a PUCCH resource. As described above, an index (an ACK/NACK resource index or a PUCCH index) of the ACK/NACK resource required to transmit the ACK/NACK signal onto the PUCCH may be expressed as at least any one of the orthogonal sequence index i, the cyclic shift index $I_{cs}$, the resource block index m, and an index for acquiring the three indexes. The ACK/NACK resource may include at least any one of the orthogonal sequence, the cyclic shift, the resource block, and a combination thereof.

Figure 7B:
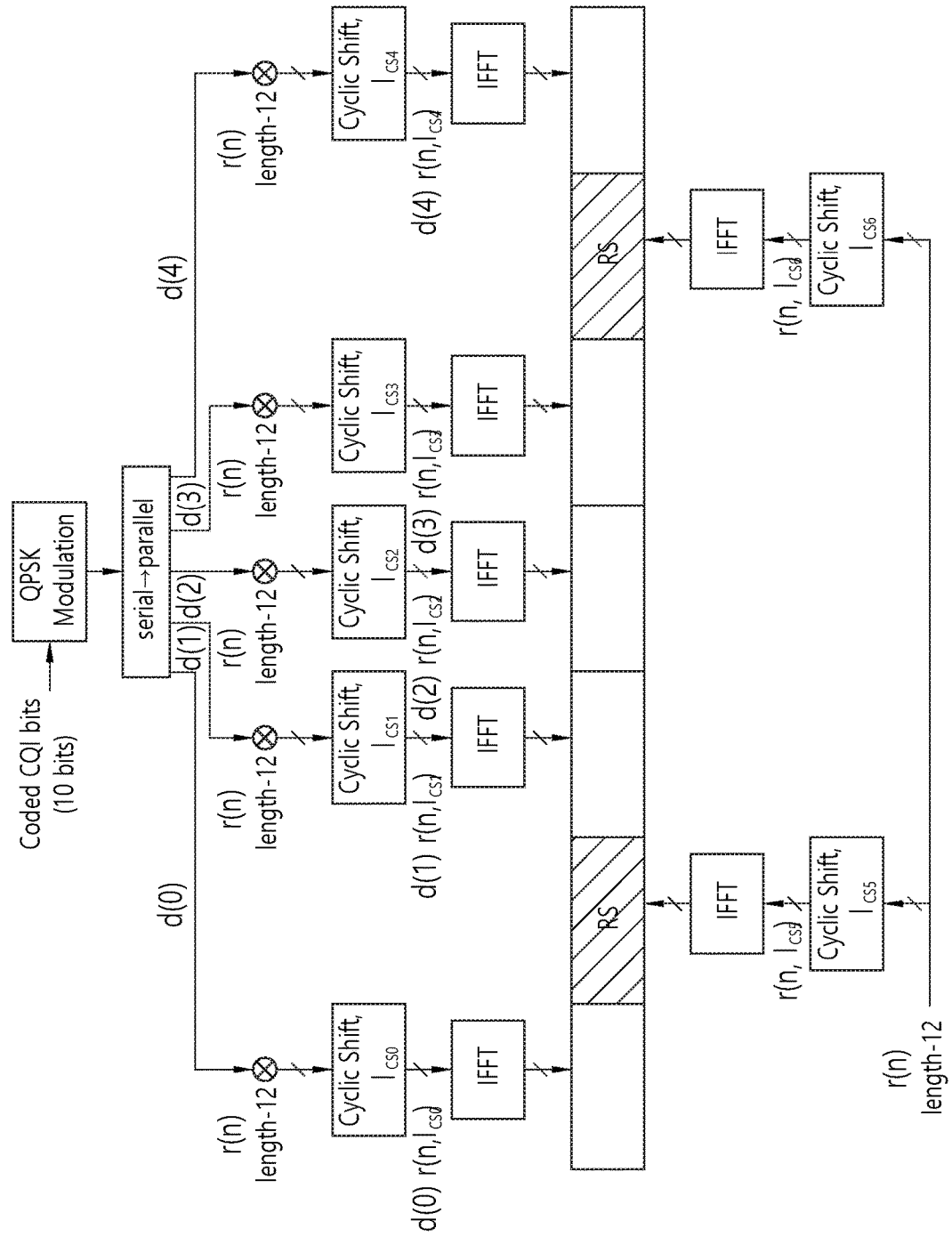
FIG. 7b illustrates a channel structure of PUCCH format 2/2a/2b in the normal CP.

FIG. 7b illustrates a channel structure of PUCCH format 2/2a/2b in the normal CP.

Referring to FIG. 7b, OFDM symbols 1 and 5 (that is, second and sixth OFDM symbols) are used for the reference signal (DMRS) for demodulation and residual OFDM symbols are used for CQI transmission in the normal CP. In an extended CP, OFDM symbol 3 (a fourth symbol) is used for the DMRS.

10 CQI bits are channel-coded at, for example, ½ code rate to become 20 coded bits. A Reed-Muller code may be used in the channel coding. In addition, the Reed-Muller code is scrambled and thereafter, constellation-mapped, and as a result, a QPSK modulation symbol is generated (d(0) to d(4) in slot 0). Each QPSK modulation symbol is modulated by cyclic shift of the basic RS sequence r(n) having a length of 12 and subjected to the IFFT to be transmitted in 10 respective SC-FDMA symbols in the subframe. 12 cyclic shifts which are spaced apart from each other allow 12 different UEs to be orthogonally multiplexed in the same PUCCH resource block. The basic RS sequence r(n) may be used as RS sequences applied to OFDM symbols 1 and 5.

Figure 7C:
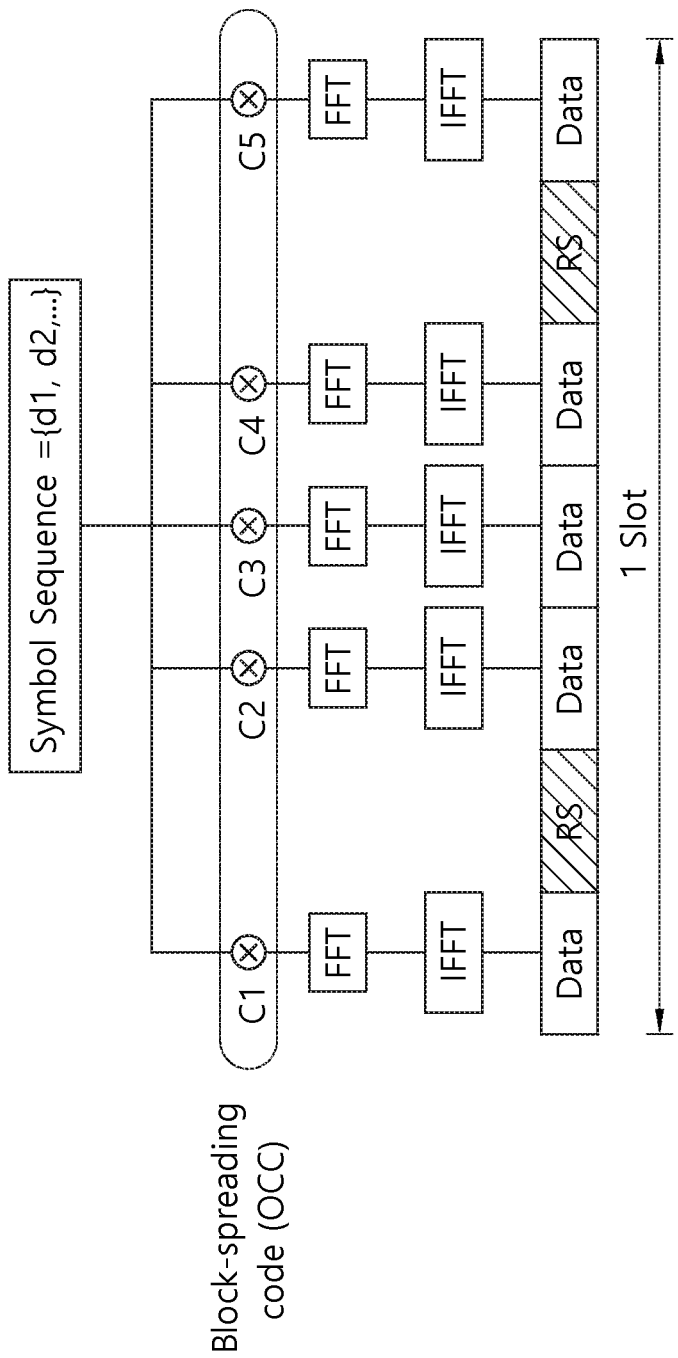
FIG. 7c illustrates the channel structure of PUCCH format 3.

FIG. 7c illustrates the channel structure of PUCCH format 3.

Referring to FIG. 7c, PUCCH format 3 is a PUCCH format using a block spreading technique. The block spreading technique means a method that spreads a symbol sequence in which multi-bit ACK/NACK is a time domain by using a block spreading code.

In the PUCCH format 3, the symbol sequence (e.g., an ACK/NACK symbol sequence) is spread and transmitted in the time domain by the block spreading code. An orthogonal cover code (OCC) may be used as the block spreading code. Control signals of multiple UEs may be multiplexed by the block spreading code. The PUCCH format 2 is different from the PUCCH format 3 in that in PUCCH format 2, symbols (e.g., d(0), d(1), d(2), d(3), d(4), etc., of FIG. 7b) transmitted in the respective data symbols are different from each other and UE multiplexing is performed by using the cyclic shift of a constant amplitude zero auto-correlation (CAZAC) sequence, while in the PUCCH format 3, the symbol sequence constituted by one or more symbols is transmitted throughout a frequency domain of each data symbol and spread in the time domain by the block spreading code to perform the UE multiplexing. In FIG. 7c, a case where 2 DMRS symbols are used in one slot is illustrated, but the present invention is not limited thereto and 3 DMRS symbols may be used and the orthogonal cover code having 4 as the spread factor may be used. The DMRS symbol may be generated from the CAZAC sequence having a specific cyclic shift and transmitted in a manner that a plurality of DMRS symbols of the time domain is multiplied by a specific orthogonal cover code.

<Uplink Reference Signal>

Hereinafter, an uplink reference signal will be described.

The reference signal is generally transported in sequence. As the sequence of the reference signal, a predetermined sequence may be used without a particular limit. As the reference signal sequence, a sequence (PSK-based computer generated sequence) generated through a phase shift keying (PSK) based computer may be used. Examples of the PSK include binary phase shift keying (BPSK), quadrature phase shift keying (QPSK), and the like. Alternatively, as the reference signal sequence, a constant amplitude zero auto-correlation (CAZAC) sequence may be used. Examples of the CAZAC sequence include a zadoff-chu (ZC) based sequence, a ZC sequence with cyclic extension, a ZC sequence with truncation, and the like. Alternatively, as the reference signal sequence, a pseudo-random (PN) sequence may be used. Examples of the PN sequence include an m-sequence, a sequence generated through the computer, a gold sequence, a Kasami sequence, and the like. Further, as the reference signal sequence, a cyclically shifted sequence may be used.

The uplink reference signal may be divided into the demodulation reference signal (DMRS) and the sounding reference signal (SRS). The DMRS is a reference signal used in the channel estimation for demodulating a received signal. The DMRS may be associated with transmission of a PUSCH or PUCCH. The SRS is a reference signal which the terminal transmits to a base station for uplink scheduling. The base station estimates an uplink channel through the received sounding reference signal and uses the estimated uplink channel in the uplink scheduling. The SRS is not associated with transmission of the PUSCH or PUCCH. The same type of base sequence may be used for the DMRS and the SRS. Meanwhile, precoding applied to the DMRS in uplink multi-antenna transmission may be the same as precoding applied to the PUSCH. Cyclic shift separation is a primary scheme that multiplexes the DMRS. In the 3GPP LTE-A system, the SRS may not be precoded and further, may an antenna specific reference signal.

The reference signal sequence $r_{u,v}^{(\alpha)}(n)$ may be defined based on a base sequence $b_{u,v}(n)$ and a cyclic shift $\alpha$ by an equation given below.

$$r_{u,v}^{(\alpha)}(n) = e^{j\alpha n} b_{u,v}(n), 0 \leq n < M_{sc}^{RS} \quad \text{[Equation 1]}$$

In Equation 1, $M_{sc}^{RS} = m \cdot N_{sc}^{RB}$ ($1 \leq m \leq N_{RB}^{max,UL}$) represents the length of the reference signal sequence. $N_{sc}^{RB}$ represents the size of a resource block represented by the number of subcarriers in the frequency domain and $N_{RB}^{max,UL}$ represents a maximum value of an uplink bandwidth represented by the multiple of $N_{sc}^{RB}$. A plurality of reference signal sequences may be defined by differently applying $\alpha$ which is the cyclic shift value from one base sequence.

The base sequence $b_{u,v}(n)$ is divided into a plurality of groups and in this case, $u \in \{0, 1, \ldots, 29\}$ represents a group number and v represents a base sequence number in a group. The base sequence depends on the length ($M_{sc}^{RS}$) of the base sequence. Each group includes one base sequence (v=0) in which the length is $M_{sc}^{RS}$ with respect to m of $1 \leq m \leq 5$ and includes two base sequences (v=0, 1) in which the length is $M_{sc}^{RS}$ with respect to m of $6 \leq m \leq n_{RB}^{max,UL}$. A sequence group number u and a base sequence number v in the group may vary depending on a time like group hopping or sequence hopping.

When the length of the reference signal sequence is $3N_{sc}^{RB}$ or more, the base sequence may be defined by an equation given below.

$$b_{u,v}(n) = x_q(n \bmod N_{ZC}^{RS}), 0 \leq n < M_{sc}^{RS} \quad \text{[Equation 2]}$$

In the above equation, q represents a root index of a Zadoff-Chu (ZC) sequence. $N_{ZC}^{RS}$ represent the length of the ZC sequence may be given as a prime number smaller than $M_{sc}^{RS}$. The ZC sequence having the root index of q may be defined by Equation 4.

$$x_q(m) = e^{-j\frac{\pi q m(m+1)}{N_{ZC}^{RS}}}, \quad \text{[Equation 3]}$$

$$0 \leq m \leq N_{ZC}^{RS} - 1$$

In the above equation, q may be given by an equation given below.

$$q = \lfloor \bar{q} + 1/2 \rfloor + v \cdot (-1)^{\lfloor 2\bar{q} \rfloor}$$

$$\bar{q} = N_{ZC}^{RS} \cdot (u+1)/31 \quad \text{[Equation 4]}$$

When the length of the reference signal sequence is $3N_{sc}^{RB}$ or less, the base sequence may be defined by an equation given below.

$$b_{u,v}(n) = e^{j\phi(n)\pi/4}, \quad 0 \le n \le M_{sc}^{RS} - 1 \quad \text{[Equation 5]}$$

A table given below shows an example in which $\varphi(n)$ is defined when $M_{sc}^{RS} = N_{sc}^{RB}$.

TABLE 3

| | $\varphi(0), \ldots, \varphi(11)$ | | | | | | | | | | | |
|---|---|---|---|---|---|---|---|---|---|---|---|---|
| 0 | -1 | 1 | 3 | -3 | 3 | 3 | 1 | 1 | 3 | 1 | -3 | 3 |
| 1 | 1 | 1 | 3 | 3 | 3 | -1 | 1 | -3 | -3 | 1 | -3 | 3 |
| 2 | 1 | 1 | -3 | -3 | -3 | -1 | -3 | -3 | 1 | -3 | 1 | -1 |
| 3 | -1 | 1 | 1 | 1 | 1 | -3 | -3 | 1 | -3 | 3 | -1 |
| 4 | -1 | 3 | 1 | -1 | 1 | -1 | -3 | -1 | 1 | -1 | 1 | 3 |
| 5 | 1 | -3 | 3 | -1 | -1 | 1 | 1 | -1 | -1 | 3 | -3 | 1 |
| 6 | -1 | 3 | -3 | -3 | -3 | 3 | 1 | -1 | 3 | 3 | -3 | 1 |
| 7 | -3 | -1 | -1 | -1 | 1 | -3 | 3 | -1 | 1 | -3 | 3 | 1 |
| 8 | 1 | -3 | 3 | 1 | -1 | -1 | -1 | 1 | 1 | 3 | -1 | 1 |
| 9 | 1 | -3 | -1 | 3 | 3 | -1 | -3 | 1 | 1 | 1 | 1 | 1 |
| 10 | -1 | 3 | -1 | 1 | 1 | -3 | -3 | -1 | -3 | -3 | 3 | -1 |
| 11 | 3 | 1 | -1 | -1 | 3 | 3 | -3 | 1 | 3 | 1 | 3 | 3 |
| 12 | 1 | -3 | 1 | 1 | -3 | 1 | 1 | 1 | -3 | -3 | -3 | 1 |
| 13 | 3 | 3 | -3 | 3 | -3 | 1 | 1 | 3 | -1 | -3 | 3 | 3 |
| 14 | -3 | 1 | -1 | -3 | -1 | 3 | 1 | 3 | 3 | 3 | -1 | 1 |
| 15 | 3 | -1 | 1 | -3 | -1 | -1 | 1 | 1 | 3 | 1 | -1 | -3 |
| 16 | 1 | 3 | 1 | -1 | 1 | 3 | 3 | 3 | -1 | -1 | 3 | -1 |
| 17 | -3 | 1 | 1 | 3 | -3 | 3 | -3 | -3 | 3 | 1 | 3 | -1 |
| 18 | -3 | 3 | 1 | 1 | -3 | 1 | -3 | -3 | -1 | -1 | 1 | -3 |
| 19 | -1 | 3 | 1 | 3 | 1 | -1 | -1 | 3 | -3 | -1 | -3 | -1 |
| 20 | -1 | -3 | 1 | 1 | 1 | 1 | 3 | 1 | -1 | 1 | -3 | -1 |
| 21 | -1 | 3 | -1 | 1 | -3 | -3 | -3 | -3 | -3 | 1 | -1 | -3 |
| 22 | 1 | 1 | -3 | -3 | -3 | -3 | -1 | 3 | -3 | 1 | -3 | 3 |
| 23 | 1 | 1 | -1 | -3 | -1 | -3 | 1 | -1 | 1 | 3 | -1 | 1 |
| 24 | 1 | 1 | 3 | 1 | 3 | -1 | 1 | -1 | -3 | -3 | 1 |
| 25 | 1 | -3 | 3 | 3 | 1 | 3 | 3 | 1 | -3 | -1 | -1 | 3 |
| 26 | 1 | 3 | -3 | -3 | 3 | -3 | 1 | -1 | -1 | 3 | -1 | -3 |
| 27 | -3 | -1 | -3 | -1 | -3 | 3 | 1 | -1 | 1 | 3 | -3 | -3 |
| 28 | -1 | 3 | -3 | 3 | -1 | 3 | 3 | -3 | 3 | 3 | -1 | -1 |
| 29 | 3 | -3 | -3 | -1 | -1 | -3 | -1 | 3 | -3 | 3 | 1 | -1 |

A table given below shows an example in which $\varphi(n)$ is defined when $M_{sc}^{RS} = 2 \ast N_{sc}^{RB}$.

TABLE 4

| | $\varphi(0), \ldots, \varphi(23)$ | | | | | | | | | | | | | | | | | | | | | | | |
|---|---|---|---|---|---|---|---|---|---|---|---|---|---|---|---|---|---|---|---|---|---|---|---|---|
| 0 | -1 | 3 | 1 | -3 | 3 | -1 | 1 | 3 | -3 | 3 | 1 | 3 | -3 | 3 | 1 | 1 | -1 | 1 | 3 | -3 | 3 | -3 | -1 | -3 |
| 1 | -3 | 3 | -3 | -3 | -3 | 1 | -3 | -3 | 3 | -1 | 1 | 1 | 1 | 3 | 1 | -1 | 3 | -3 | -3 | 1 | 3 | 1 | 1 | -3 |
| 2 | 3 | -1 | 3 | 3 | 1 | 1 | -3 | 3 | 3 | 3 | 3 | 1 | -1 | 3 | -1 | 1 | 1 | -1 | -3 | -1 | -1 | 1 | 3 | 3 |
| 3 | -1 | -3 | 1 | 1 | 3 | -3 | 1 | 1 | -3 | -1 | -1 | 1 | 3 | 1 | 3 | 1 | -1 | 3 | 1 | 1 | -3 | -1 | -3 | -1 |
| 4 | -1 | -1 | -1 | -3 | -3 | -1 | 1 | 1 | 3 | 3 | -1 | 3 | -1 | 1 | -1 | -3 | 1 | -1 | -3 | -3 | 1 | -3 | -1 | -1 |
| 5 | -3 | 1 | 1 | 3 | -1 | 1 | 3 | 1 | -3 | 1 | -3 | 1 | 1 | -1 | -1 | 3 | -1 | -3 | 3 | -3 | -3 | -3 | 1 | 1 |
| 6 | 1 | 1 | -1 | -1 | 3 | -3 | 3 | -3 | 1 | -1 | -1 | 1 | -1 | 1 | -1 | -3 | -1 | 1 | -1 | 3 | -1 | -3 |
| 7 | -3 | 3 | 3 | -1 | -1 | -3 | -1 | 3 | 1 | 3 | 1 | 3 | 1 | 1 | -1 | 3 | 1 | -1 | 1 | 3 | -3 | -1 | -1 | 1 |
| 8 | -3 | 1 | 3 | -3 | 1 | -1 | -3 | 3 | -3 | 3 | -1 | -1 | -1 | -1 | 1 | -3 | -3 | -3 | 1 | -3 | -3 | -3 | 1 | -3 |
| 9 | 1 | 1 | -3 | 3 | 3 | -1 | -3 | -1 | 3 | -3 | 3 | 3 | 3 | -1 | 1 | 1 | -3 | 1 | -1 | 1 | 1 | -3 | 1 | 1 |
| 10 | -1 | 1 | -3 | -3 | 3 | -1 | 3 | -1 | -1 | -3 | -3 | -3 | -1 | -3 | -3 | 1 | -1 | 1 | 3 | 3 | -1 | 1 | -1 | 3 |
| 11 | 1 | 3 | 3 | -3 | -3 | 1 | 3 | 1 | -1 | -3 | -3 | -3 | 3 | 3 | -3 | 3 | 3 | -1 | -3 | 3 | -1 | 1 | -3 | 1 |
| 12 | 1 | 3 | 3 | 1 | 1 | 1 | -1 | -1 | 1 | -3 | 3 | -1 | 1 | 1 | -3 | 3 | 3 | -1 | -3 | 3 | -3 | -1 | -3 | -1 |
| 13 | 3 | -1 | -1 | -1 | -1 | -3 | -1 | 3 | 3 | 1 | -1 | 1 | 3 | 3 | 3 | -1 | 1 | 1 | -3 | 1 | 3 | -1 | -3 | 3 |
| 14 | -3 | -3 | 3 | 1 | 3 | 1 | -3 | 3 | 1 | 3 | 1 | 1 | 3 | 3 | -1 | -1 | -3 | 1 | -3 | -1 | 3 | 1 | 1 | 3 |
| 15 | -1 | -1 | 1 | -3 | 1 | 3 | -3 | 1 | -1 | -3 | -1 | 3 | 1 | 3 | 1 | -1 | -3 | -3 | -1 | -1 | -3 | -3 | -3 | -1 |
| 16 | -1 | -3 | 3 | -1 | -1 | -1 | -1 | 1 | 1 | -3 | 3 | 1 | 3 | 3 | 1 | -1 | 1 | -3 | 1 | -3 | 1 | 1 | -3 | -1 |
| 17 | 1 | 3 | -1 | 3 | 3 | -1 | -3 | 1 | -1 | -3 | 3 | 3 | 3 | -1 | 1 | 1 | 3 | -1 | -3 | -1 | 3 | -1 | -1 | -1 |
| 18 | 1 | 1 | 1 | 1 | 1 | -1 | 3 | -1 | -3 | 1 | 1 | 3 | -3 | 1 | -3 | -1 | 1 | 1 | -3 | -3 | 3 | 1 | 1 | -3 |
| 19 | 1 | 3 | 3 | 1 | -1 | -3 | 3 | -1 | 3 | 3 | 3 | -3 | 1 | -1 | 1 | -1 | -3 | -1 | 1 | 3 | -1 | 3 | -3 | -3 |
| 20 | -1 | -3 | 3 | -3 | -3 | -3 | -1 | -1 | -3 | -1 | -3 | 3 | 1 | 3 | -3 | -1 | 3 | -1 | 1 | -1 | 3 | -3 | 1 | -1 |
| 21 | -3 | -3 | 1 | 1 | -1 | 1 | -1 | 1 | -1 | 3 | 1 | -3 | -1 | 1 | -1 | 1 | -1 | -1 | 3 | 3 | -3 | -1 | 1 | -3 |
| 22 | -3 | -1 | -3 | 3 | 1 | -1 | -3 | -1 | -3 | -3 | 3 | -3 | 3 | -3 | -1 | 1 | 3 | 1 | -3 | 1 | 3 | 3 | -1 | -3 |
| 23 | -1 | -1 | -1 | -1 | 3 | 3 | 3 | 1 | 3 | 3 | -3 | 1 | 3 | -1 | 3 | -1 | 3 | 3 | -3 | 3 | 1 | -1 | 3 | 3 |
| 24 | 1 | -1 | 3 | 3 | -1 | -3 | 3 | -3 | -1 | -1 | 3 | -1 | 3 | -1 | -1 | 1 | 1 | 1 | 1 | -1 | -1 | -3 | -1 | 3 |
| 25 | 1 | -1 | 1 | -1 | 3 | -1 | 3 | 1 | 1 | -1 | -1 | -3 | 1 | 1 | -3 | 1 | 3 | -3 | 1 | 1 | -3 | -3 | -1 | -1 |
| 26 | -3 | -1 | 1 | 3 | 1 | 1 | -3 | -1 | -1 | -3 | 3 | -3 | 3 | 1 | -3 | 3 | -3 | 1 | -1 | 1 | -3 | 1 | 1 | 1 |
| 27 | -1 | -3 | 3 | 3 | 1 | 1 | 3 | -1 | -3 | -1 | -1 | -1 | 3 | 1 | -3 | -3 | -1 | 3 | -3 | -1 | -3 | -1 | -3 | -1 |
| 28 | -1 | -3 | -1 | -1 | 1 | -3 | -1 | -1 | 1 | -1 | -3 | 1 | 1 | -3 | 1 | -3 | -3 | 3 | 1 | 1 | -1 | 3 | -1 | -1 |
| 29 | 1 | 1 | -1 | -1 | -3 | -1 | 3 | -1 | 3 | -1 | 1 | 3 | 1 | -1 | 3 | 1 | 3 | -3 | -3 | 1 | -1 | -1 | 1 | 3 |

Hopping of the reference signal may be applied as described below.

A sequence group number u of slot $n_s$ may be defined based on a group hopping pattern $f_{gh}(n_s)$ and a sequence shift pattern $f_{ss}$ by an equation given below.

$$u=(f_{gh}(n_s)+f_{ss})\bmod 30 \quad [\text{Equation 6}]$$

17 different group hopping patterns and 30 different sequence shift patterns may exist. Group hopping may be applied or not applied by a group-hopping-enabled parameter which is a cell specific parameter provided by the higher layer. Further, the group hopping for the PUSCH may not be applied to specific UE by a disable-sequence-group-hopping parameter which is a UE specific parameter. The PUCCH and the PUSCH may have the same group hopping pattern and different sequence shift patterns.

The group hopping pattern $f_{gh}(n_s)$ is the same with respect to the PUSCH and the PUCCH and may be defined by an equation given below.

$$f_{gh}(n_s) = \begin{cases} 0 & \text{if group hopping is disabled} \\ \left(\sum_{i=0}^{7} c(8n_s + i)\cdot 2^i\right)\bmod 30 & \text{if group hopping is enabled} \end{cases} \quad [\text{Equation 7}]$$

In the above equation, c(i) as an imitation pseudo-random sequence which is a PN sequence may be defined by a gold sequence having a length of −31. An equation given below shows one example of the gold sequence c(n).

$$c(n)=(x_1(n+N_c)+x_2(n+N_c))\bmod 2$$

$$x_1(n+31)=(x_1(n+3)+x_1(n))\bmod 2$$

$$x_2(n+31)=(x_2(n+3)+x_2(n+2)+(n+1)+x_1(n))\bmod 2 \quad [\text{Equation 8}]$$

Herein, Nc=1600, $x_1(i)$ represents a 1 m-th sequence, and $x_2(i)$ represents a 2 m-th sequence. The imitation pseudo-number sequence generator may be initialized to $$c_{init} = \left\lfloor \frac{N_{ID}^{cell}}{30} \right\rfloor$$

at the beginning of each radio frame.

Definition of the sequence shift pattern $f_{ss}$ may be different with respect to the PUCCH and the PUSCH. The sequence shift pattern of the PUCCH may be given as $f_{ss}^{PUCCH}=N_{ID}^{cell} \bmod 30$. The sequence shift pattern of the PUSCH may be given as $f_{ss}^{PUSCH}=(f_{ss}^{PUCCH}+\Delta_{ss})\bmod 30$ and $\Delta_{ss}\in\{0, 1, \ldots, 29\}$ may be configured by the higher layer.

The sequence hopping may be applied only to a reference signal sequence having a length longer than $6N_{sc}^{RB}$. With respect to a reference signal sequence having a length shorter than $6N_{sc}^{RB}$, the base sequence number is given as v=0 in the base sequence group. With respect to the reference signal sequence having the length longer than $6N_{sc}^{RB}$, the base sequence number v in the base sequence group in slot $n_s$ may be defined by Equation 10.

$$v = \begin{cases} c(n_s) & \text{if group hopping is disabled and sequence hopping is enabled} \\ 0 & \text{otherwise} \end{cases} \quad [\text{Equation 9}]$$

c(i) may be expressed by an example of Equation 8 given above. The sequence hopping may be applied or not applied by a sequence-hopping-enabled parameter which is a cell specific parameter provided by the higher layer. Further, the sequence hopping for the PUSCH may not be applied to specific UE by the disable-sequence-group-hopping parameter which is the UE specific parameter. The imitation pseudo-number sequence generator may be initialized to $$c_{init} = \left\lfloor \frac{N_{ID}^{cell}}{30} \right\rfloor \cdot 2^5 + f_{ss}^{PUSCH}$$

at the beginning of each radio frame.

A PUSCH DMRS sequence $r_{PUSCH}^{(\lambda)}(.)$ depending on a layer $\lambda(0, 1, \ldots, \gamma-1)$ may be defined by Equation 11.

$$r_{PUSCH}^{(\lambda)}(m\cdot M_{sc}^{RS}+n)=w^{(\lambda)}(m)r_{u,v}^{(\alpha_\lambda)}(n) \quad [\text{Equation 10}]$$

In the above equation, m=0, 1, ... and n=0, ..., $M_{sc}^{RS}-1$. $M_{sc}^{RS}=M_{sc}^{PUSCH}$. An orthogonal sequence $w^{(\lambda)}(m)$ may be determined according to a table to be described below.

In the slot $n_s$, the cyclic shift may be given as $\alpha=2\pi n_{cs}/12$ and $n_{cs}$ may be defined by an equation given below.

$$n_{cs,\lambda}=(n_{DMRS}^{(1)}+n_{DMRS,\lambda}^{(2)}+n_{PN}(n_s))\bmod 12 \quad [\text{Equation 11}]$$

In the above equation, $n_{DMRS}^{(1)}$ may be determined according to a cyclicShift parameter provided by the higher layer. A table given below shows an example of $n_{DMRS}^{(1)}$ determined according to the cyclicShift parameter.

TABLE 5

| Parameter | $n_{DMRS}^{(1)}$ |
|---|---|
| 0 | 0 |
| 1 | 2 |
| 2 | 3 |
| 3 | 4 |
| 4 | 6 |
| 5 | 8 |
| 6 | 9 |
| 7 | 10 |

Referring back to the above equation, $n_{DMRS,\lambda}^{(2)}$ may be determined by a DMRS cyclic shift field in DCI format 0 for the transport block depending on corresponding PUSCH transmission. A table given below shows an example of $n_{DMRS,\lambda}^{(2)}$ determined according to DMRS cyclic shift field.

TABLE 6

| DMRS cyclic shift field | $n_{DMRS,\lambda}^{(2)}$ | | | | $[w^{(\lambda)}(0)\ w^{(\lambda)}(1)]$ | | | |
|---|---|---|---|---|---|---|---|---|
| | $\lambda=0$ | $\lambda=1$ | $\lambda=2$ | $\lambda=3$ | $\lambda=0$ | $\lambda=1$ | $\lambda=2$ | $\lambda=3$ |
| 000 | 0 | 6 | 3 | 9 | [1 1] | [1 1] | [1 −1] | [1 −1] |
| 001 | 6 | 0 | 9 | 3 | [1 −1] | [1 −1] | [1 1] | [1 1] |
| 010 | 3 | 9 | 6 | 0 | [1 −1] | [1 −1] | [1 1] | [1 1] |
| 011 | 4 | 10 | 7 | 1 | [1 1] | [1 1] | [1 1] | [1 1] |

TABLE 6-continued

| DMRS cyclic shift field | $n^{(2)}_{DMRS,\lambda}$ | | | | $[w^{(\lambda)}(0)\ w^{(\lambda)}(1)]$ | | | |
|---|---|---|---|---|---|---|---|---|
| | $\lambda = 0$ | $\lambda = 1$ | $\lambda = 2$ | $\lambda = 3$ | $\lambda = 0$ | $\lambda = 1$ | $\lambda = 2$ | $\lambda = 3$ |
| 100 | 2 | 8 | 5 | 11 | [1 1] | [1 1] | [1 1] | [1 1] |
| 101 | 8 | 2 | 11 | 5 | [1 −1] | [1 −1] | [1 −1] | [1 −1] |
| 110 | 10 | 4 | 1 | 7 | [1 −1] | [1 −1] | [1 −1] | [1 −1] |
| 111 | 9 | 3 | 0 | 6 | [1 1] | [1 1] | [1 −1] | [1 −1] |

$n_{PN}(n_s)$ may be defined by an equation given below.

$$n_{PN}(n_s) = \Sigma_{i=0}^{7} c(8N_{symb}^{UL} \cdot n_s + i) \cdot 2^i \quad \text{[Equation 12]}$$

c(i) may be expressed by the example of Equation 8 given above and applied for each cell of c(i). The imitation pseudo-number sequence generator may be initialized to $$c_{init} = \left\lfloor \frac{N_{ID}^{cell}}{30} \right\rfloor \cdot 2^5 + f_{ss}^{PUSCH}$$

at the beginning of each radio frame.

The vector of the reference signal may be precoded by an equation given below.

$$\begin{bmatrix} \tilde{r}_{PUSCH}^{(0)} \\ \vdots \\ \tilde{r}_{PUSCH}^{(P-1)} \end{bmatrix} = W \begin{bmatrix} r_{PUSCH}^{(0)} \\ \vdots \\ r_{PUSCH}^{(\upsilon-1)} \end{bmatrix} \quad \text{[Equation 13]}$$

In the above equation, P represents the number of antenna ports used for the PUSCH transmission. W represents a precoding matrix. With respect to the PUSCH transmission using the single antenna port, P=1, W=1, and γ=1. Further, with respect to spatial multiplexing, P=2 or 4.

With respect to each antenna port used for the PUSCH transmission, the DMRS sequence is multiplied by an amplitude scaling factor $\beta_{PUSCH}$ and sequentially mapped to the resource block. A set of physical resource blocks used for the mapping is the same as the set of physical resource blocks used for the PUSCH transmission. In the subframe, the DMRS sequence may be first mapped to the resource element in a direction in which the DMRS sequence increases in the frequency domain and thereafter, in a direction in which the slot number increases. The DMRS sequence may be mapped to a fourth SC-FDMA symbol (SC-FDMA symbol 3) in the case of the normal CP and a third SC-FDMA symbol (SC-FDMA symbol 2) in the case of the extension CP.

Figure 8A:
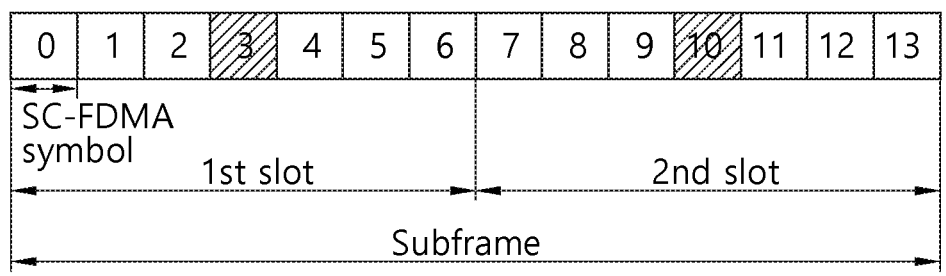
FIGS. 8a and 8b are one example of a subframe in which a DMRS for a PUSCH is transmitted.
Figure 8A:
Figure 8B:
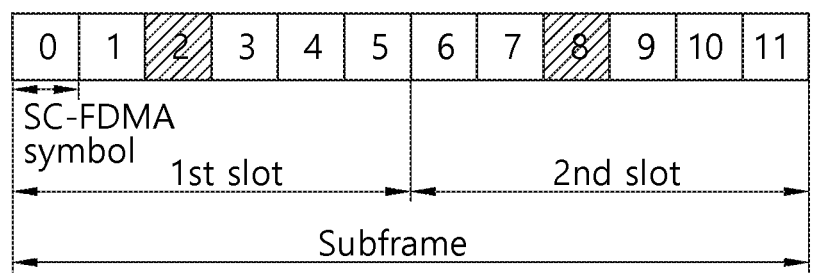
Figure 8B:

FIGS. 8a and 8b are one example of a subframe in which a DMRS for a PUSCH is transmitted.

The structure of the subframe in FIG. 8a shows a case of the normal CP. The subframe includes the first slot and the second slot. Each of the first slot and the second slot includes 7 SC-FDMA symbols. Symbol indexes of 0 to 13 are granted to 14 SC-FDMA symbols in the subframe. The reference signal may be transmitted through the SC-FDMA symbols having symbol indexes 3 and 10. The reference signal may be transmitted by using the sequence. The Zadoff-Chu (ZC) sequence may be used as the reference signal sequence and various ZC sequences may be generated according to a root index and a cyclic shift value. The base station allocates different cyclic shift values to the terminal to estimate channels of a plurality of terminals through an orthogonal sequence or quasi-orthogonal sequence. Locations of the frequency domains occupied by the reference signal in may be the same as each other or different from each other in two slots in the subframe. In two slots, the same reference signal sequence is used. Data may be transmitted through the residual SC-FDMA symbols other than the SC-FDMA symbol in which the reference signal is transmitted.

The structure of the subframe in FIG. 8b shows a case of the extension CP. The subframe includes the first slot and the second slot. Each of the first slot and the second slot includes 6 SC-FDMA symbols. Symbol indexes of 0 to 11 are granted to 12 SC-FDMA symbols in the subframe. The reference signal is transmitted through the SC-FDMA symbols having symbol indexes 2 and 8. The data is transmitted through the residual SC-FDMA symbols other than the SC-FDMA symbol in which the reference signal is transmitted.

<Carrier Aggregation>

Hereinafter, a carrier aggregation (CA) system will be described.

The carrier aggregation (CA) system means aggregating multiple component carriers (CCs). By the carrier aggregation, the existing meaning of the cell is changed. According to the carrier aggregation, the cell may mean a combination of a downlink component carrier and an uplink component carrier or a single downlink component carrier.

Further, in the carrier aggregation, the cell may be divided into a primary cell, secondary cell, and a serving cell. The primary cell means a cell that operates at a primary frequency and means a cell in which the UE performs an initial connection establishment procedure or a connection reestablishment procedure with the base station or a cell indicated by the primary cell during a handover procedure. The secondary cell means a cell that operates at a secondary frequency and once an RRC connection is established, the secondary cell is configured and is used to provide an additional radio resource.

As described above, the carrier aggregation system may support a plurality of component carriers (CC), that is, a plurality of serving cells unlike a single carrier system.

The carrier aggregation system may support cross-carrier scheduling. The cross-carrier scheduling is a scheduling method that may perform resource allocation of the PDSCH transmitted through another component carrier through th(E)PDCCH transmitted through a specific component carrier and/or resource allocation of the PUSCH transmitted through other component carrier other than the component carrier fundamentally linked with the specific component carrier.

<Introduction of Small Cell>

Meanwhile, in a next-generation mobile communication system, it is anticipated that a small cell having a small cell coverage radius will be added into coverage of the existing cell and it is anticipated that the small cell will process more traffic. Since the existing cell has larger than the small cell, the existing call may be called a macro cell. Hereinafter, it will be described with reference to FIG. 10.

Figure 9:
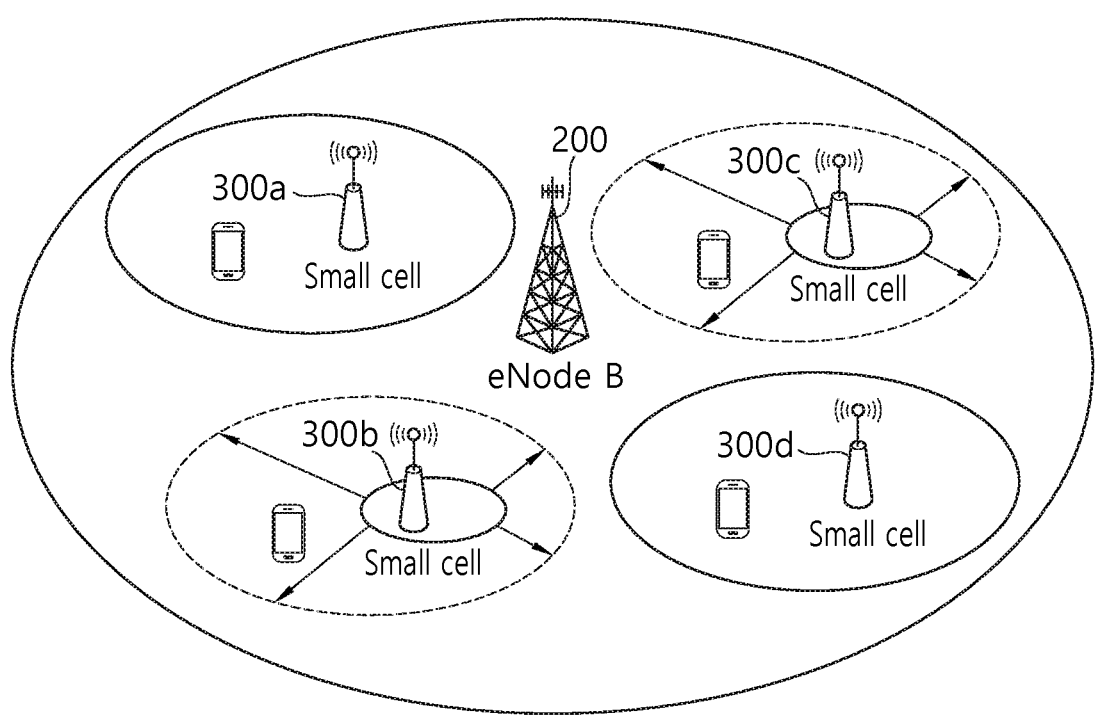
FIG. 9 is a diagram illustrating an environment of heterogeneous networks of a macro cell and a small cell which may become a next-generation wireless communication system.

FIG. 9 is a diagram illustrating an environment of heterogeneous networks of a macro cell and a small cell which may become a next-generation wireless communication system.

Referring to FIG. 9, a heterogeneous-network environment is shown, in which a macro cell by the existing base station 200 overlaps with a small cell by one or more small base stations 300a, 300b, 300c, and 300d. Since the existing base station provides the larger coverage than the small base station, the existing base station may be called a macro base station (macro eNodeB, or MeNB). In the present specification, terms such as the macro cell and the macro base station will be mixedly used. The UE that accesses the macro cell 200 may be referred to as macro UE. The macro UE receives a downlink signal from the macro base station and transmits an uplink signal to the macro base station.

In the heterogeneous networks, the macro cell is configured as a primary cell (Pcell) and the small cell is configured as a secondary cell (Scell) to fill a coverage gap of the macro cell. Further, the small cell is configured as the primary cell (Pcell) and the macro cell is configured as the secondary cell (Scell) to boost overall performance.

Meanwhile, the small cell may use a frequency band assigned to current LTE/LTE-A or use a higher frequency band (e.g., a band of 3.5 GHz or higher).

On the other hand, in a next LTE-A system, it is considered that the small cell may not be independently used and the small cell may be used only as a macro-assisted small cell which may be used under assistance of the macro cell.

The small cells 300a, 300b, 300c, and 300d may have similar channel environments to each other and since the small cells 300a, 300b, 300c, and 300d are positioned at distances which are proximate to each other, interference among the small cells may be a large issue.

In order to reduce an interference influence, the small cells 300b and 300c may extend or reduce coverage thereof. The extension and reduction of the coverage is referred to as cell breathing. For example, as illustrated in FIG. 9, the small cells 300b and 300c may be turned on or off according to a situation.

On the other hand, the small cell may use the frequency band assigned to the current LTE/LTE-A or use the higher frequency band (e.g., the band of 3.5 GHz or higher).

<Enhanced Carrier Aggregation: eCA>

Figure 10:
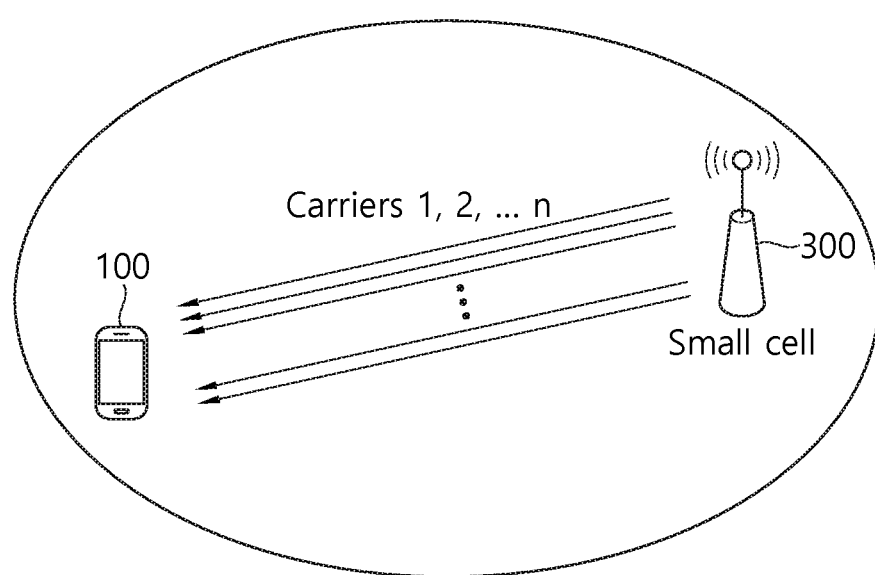
FIG. 10 is an illustration of the concept of eCA, which may be the next generation wireless communication system.

FIG. 10 is an illustration of the concept of eCA, which may be the next generation wireless communication system.

In the next system, in order to process the rapidly increasing downlink data, it is possible to consider aggregating up to Y carriers by improving the legacy scheme in which only up to 5 legacy carriers may be aggregated. The value of Y may be 8, 16, 32, and so on. Also, it may be considered to classify and manage cells (e.g., set cells or activated cells) resulting from the carrier aggregation CA into a plurality of groups.

However, when more than five cells are used according to the carrier aggregation, the HARQ ACK/NACK exceeds 20 bits. However, there is no way to transmit HARQ ACK/NACK exceeding 20 bits in the legacy PUCCH format.

Embodiment of the Present Disclosure

Therefore, the embodiment of the present disclosure aims at presenting a scheme to solve this problem.

Specifically, in accordance with one embodiment of the present disclosure, for the purpose of handling the amount of rapidly increasing downlink traffic, in an environment that uses an enhanced carrier aggregation technique to aggregate up to X (for example, up to 32) cells exceeding 5 cells, a new PUCCH format configured for transmitting increased UCI (including HARQ-ACK and CSI) will be proposed.

The new PUCCH format may be similar to the legacy PUCCH format 3, and may be a form using a plurality of PRBs. Alternatively, the new PUCCH format may have the same format as the PUSCH and may have the format in which multiplexing is not supported in the same RB. The UCI may be of a form including a CRC in the next system, and the corresponding CRC may be 8 bits, for example. When the new PUCCH format is transmitted in a data region like a PUSCH, and a multiplexing scheme, for example, cyclic shift (CS) and/or orthogonal cover code (OCC) is not applied thereto in the data region, consumption of a radio resource (for example, RB) may be increased when a plurality of UEs are transmitting the new PUCCH format. In addition, according to this approach, in allocating resources for other channels such as PUSCH or other PUCCH, efficiency of the entire system may be deteriorated.

Accordingly, according to the embodiment of the present disclosure, there are suggested a scheme where a new PUCCH format having a legacy PUSCH format shares resources (for example, RB) in the data region with the legacy PUSCH, and a scheme where multiple UEs share resources in the data region in order for the multiple UEs to efficiently transmit the new PUCCH format in the data region. Further, according to an embodiment of the present disclosure, when the number of DMRS symbols per slot is 2 as in the legacy PUCCH format 3, and the OCC is not applied in the data region, a scheme for sharing resources between the new PUCCH format and the legacy PUCCH format 3 is also presented.

According to the present disclosure, the new PUCCH format refers to a format (referred to as "PUSCH-like format 1") having one DMRS symbol per slot like a PUSCH and in which no OCC is applied to the remaining symbols. Alternatively, the new PUCCH format may refer to a format (referred to as "PUSCH-like format 2") having two DMRS symbols per slot like a legacy PUCCH format 3 and in which no OCC is applied to the remaining symbols. Alternatively, the new PUCCH format may refer to a format (referred to as "multi-RB PF3 format") having two DMRS symbols per slot like a legacy PUCCH format 3 and in which OCC is applied to the remaining symbols and the format occupies a plurality of PRBs (pair).

I. DMRS Configuration Scheme for New PUCCH Format (Standard Improvement)

In the legacy Rel-10 LTE system, the base station was able to schedule PUSCH to two geographically different UEs within the same resource. In this case, by considering that the channel environments between the base station and UEs are independent of each other, and by using CS/OCC, the DMRS sequence may be identified in a semi-orthogonal manner by the base station. Thus, the base station may finally distinguish between PUSCH transmissions transmitted from two UEs. The above schemes may collectively be referred to as MU-MIMO. This scheme may be applied to a resource sharing scheme between the new PUCCH formats of a PUSCH structure, or a resource sharing scheme between the new PUCCH format of a PUSCH structure and a legacy PUSCH. Alternatively, even when the new PUCCH format is designed without considering multiplexing in the same resource (i.e., even when OCC/CS is not applied in the data region), a plurality of DMRS candidate groups may be configured rather than a single DMRS is configured. In a more specific example, a candidate configurable for the DMRS for the new PUCCH format in the same resource may be cyclic shifted based on the following equation:

$$n_{cs,\lambda} = (n_{DMRS}^{(1)} + n_{DMRS,\lambda}^{(2)} + n_{PN}(n_s)) \bmod 12 \quad \text{[Equation 14]}$$

In this equation, $n^{(1)}$ DMRS and $n_{PN}(n_s)$ are values that are configured and signaled by the upper layer. That is, $n^{(1)}$ DMRS and $n_{PN}(n_s)$ may be values signaled by the upper layer as in Equation 11 above. The value of $n^{(1)}$ DMRS may be the same value as the value of $n^{(1)}$ DMRS for the configuration of PUSCH of the corresponding cell or the latter may be transferred as the former as it is unmodified. That is, a value signaled in the upper layer, as in Equation 11 for the DMRS of the PUSCH may be directly applied to the DMRS for the new PUCCH format. Alternatively, the Cell ID used for the $n_{PN}(n_s)$ (i.e., $N^{cell}_{ID}$ used in Equation 12) may not be configured by the upper layer. In this case, the value of the $n_{PN}(n_s)$ for the configuration of the PUSCH of the corresponding cell maybe transferred as the value of the $n_{PN}(n_s)$ as it is unmodified. Further, the $n^{(2)}DMRS,_\lambda$ may be a value that may be changed more flexibly. In this connection, the $n^{(2)}DMRS,_\lambda$ may be the same value as the DMRS candidate group of the PUSCH or a value selected from the subset of the DMRS candidate group of the PUSCH, as shown in Table 6. For example, the subset may comprise a set of CSs having the same OCC value, and the subset may be pre-specified by the upper layer of the base station and then notified to the UE. In this case, the DMRS sequence for the new PUCCH format transmitted in the same RB may be changed according to the PUSCH transmission at each time point and the DMRS sequence of the corresponding PUSCH. The base station may extract the PUSCH and the new PUCCH format sharing the same resource with each other, based on the DMRS sequence distinguished by the OCC/CS.

On the other hand, a scheme for selecting the $n^{(2)}DMRS,_\lambda$ in the above equation from a candidate group as preconfigured or as configured in the upper layer may be as follows:

In the first scheme, the value of the CS cyclic shift for the DMRS may be used as a parameter to determine the PUCCH resource. In other words, the PUCCH resource may be represented by a combination of RB index and CS for DMRS. In this case, a plurality of PUCCH resources may exist in one RB and each PUCCH resource in the same RB may have different DMRS sequences. It may be assumed that when the CS value for the DMRS or the RB index value have different values, the indexes of the corresponding PUCCH resources are also different. Further, it may be assumed that when both the CS for the DMRS and RB indexes have the same value, the corresponding PUCCH resource index values are the same.

In the second scheme, the value of CS for the DMRS may be determined according to a parameter based on (E)CCE mapped to(E) PDCCH corresponding to PUCCH. In this connection, a parameter based on the ARO (ACK/NACK Resource Offset) may be additionally used. The PUCCH may include HARQ-ACK. That is, it may be assumed that the CS value for the DMRS varies depending on the location of transmission of the (E) PDCCH corresponding to the HARQ-ACK. In this case, it may be assumed that the PUCCH resource is distinguished using the RB index. It may be assumed that when the RB indexes are the same, the PUCCH resource indices are also the same, while when the RB indexes are different, the corresponding PUCCH resource indexes are also different.

In the third scheme, the value of CS for the DMRS may be determined based on the indication field in the downlink control information (DCI) contained in the (E)PDCCH corresponding to the PUCCH. The indication field may be 3 bits long, or 2 bits long or 1 bit long. In this case, it may be assumed that the PUCCH resource is distinguished using the RB index. Further, it may be assumed that when the RB indexes are the same, the PUCCH resource indexes are the same, while when the RB indexes are different, corresponding PUCCH resource indexes are also different.

In the fourth scheme, the value of the CS for the DMRS may be determined based on the ARI (ACK/NACK Resource Indicator) field included in the DCI in the (E) PDCCH scheduling the PDSCH. In this case, each ARI field value may represent a CS value for the DMRS in addition to the PUCCH resource. In this case, it may be assumed that the PUCCH resource is distinguished using the RB index. Further, it may be assumed that when the RB indexes are the same, the PUCCH resource indexes are the same, while when the RB indexes are different, the corresponding PUCCH resource indexes are also different.

In the case of the PUSCH-like format 1, the PUCCH resource may be distinguished/indexed based on the combination of the RB index and the CS for the DMRS. Thus, between the different PUCCH resources, one of the RB index and the CS for the DMRS may be differently configured. On the basis of this configuration, the base station may preconfigure a plurality of PUCCH resources having different combinations of RB index and DMRS CS. In this state, the base station may designate one of a plurality of corresponding PUCCH resources as a resource for ACK/NACK transmission via the ARI of DCI.

In the case of the PUSCH-like format 2, the PUCCH resources may be distinguished/indexed based on a combination of the RB index, CS for the DMRS, and OCC for DMRS (applied between two DMRSs in the same slot). Thus, between the different PUCCH resources, at least one of the RB index and the CS for the DMRS and the OCC may be configured differently. On the basis of this configuration, the base station may preconfigure a plurality of PUCCH resources having different combinations of RB index and DMRS CS/OCC. In this state, the base station may designate one of a plurality of corresponding PUCCH resources as a resource for ACK/NACK transmission via the ARI in DL grant DCI.

The resource sharing scheme between the new PUCCH formats or between the new PUCCH format and the legacy PUSCH may be applied when the UEs are different from each other. However, the present disclosure is limited thereto. The scheme may be applied extensively even when the same UE is sharing resources. However, when the same UE transmits the PUSCH and the new PUCCH format, the antenna ports APs may be different from each other.

The above description will be briefly described with reference to the drawings as follows.

Figure 11:
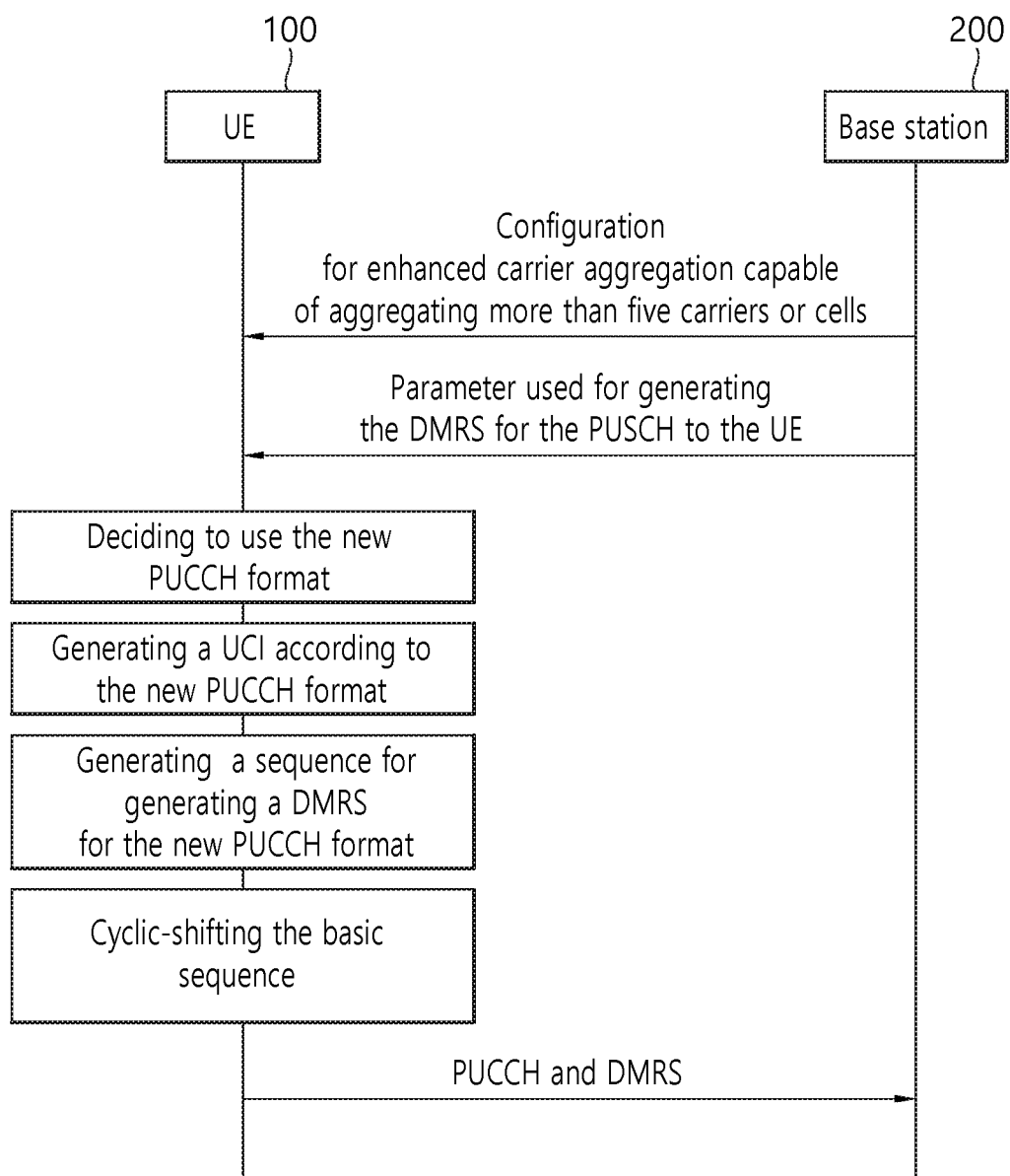
FIG. 11 is a flow chart showing a scheme according to one embodiment of the present disclosure.

FIG. 11 is a flow chart showing a scheme according to one embodiment of the present disclosure.

As may be seen from FIG. 11, the base station 200 configures the UE for enhanced carrier aggregation capable of aggregating more than five carriers or cells.

In addition, the base station 200 transmits a parameter used for generating the DMRS for the PUSCH to the UE 100. The parameter may be $n^{(1)}_{DMRS}$ used in the above Equation 11.

The UE 100 determines a PUCCH format to be used in the enhanced carrier aggregation environment. In this connection, the UE may decide to use the new PUCCH format presented according to the present disclosure.

The UE 100 generates a UCI according to the new PUCCH format.

Then, the UE 100 generates a basic sequence for generating a DMRS for the new PUCCH format. In this connection, the basic sequence may be generated as in, for example, Equation 5.

The UE 100 cyclic-shifts the basic sequence to generate a DMRS for the new PUCCH format. In this connection, a parameter used in the equation for the cyclic-shift may be a parameter $n^{(1)}_{DMRS}$ used to generate the DMRS for the PUSCH, and this parameter may be the same as the parameter used for the DMRS for the PUSCH. That is, the parameter may be the same as the parameter used in Eq. 11.

When the DMRS generation is completed, the UE 100 maps the DMRS for the new PUCCH format to a radio resource. In this connection, the DMRS for the new PUCCH format may be mapped onto one symbol per slot.

Then, the UE 100 transmits the DMRS for the PUCCH.

II. Hopping on Slot Basis

When the UE performs PUSCH transmission, the UE may not perform hopping itself according to the PUSCH hopping configuration, and the hopping may be performed on a slot or a subframe basis. To the contrary, basically, as for PUCCH (for example, PUCCH format 1/1a/1b/2/2a/2b/3) up to the Rel-10 system, frequency hopping may be executed on a slot basis. In this case, it may be general that PUCCH and PUSCH are overlapped only in one slot. In this case, for efficient resource sharing between PUCCH and PUSCH, channel independence between UEs must be ensured. This may limit a region in which the resource sharing scheme may be used. As a scheme to mitigate this problem, one UE may consider matching the hopping presence or absence and hopping scheme on a slot basis between the PUCCH and PUSCH.

In brief, when hopping on a slot basis is not applied to the PUSCH, the hopping on a slot basis may not be applied to the PUCCH. When performing hopping on the slot basis for the PUSCH, the PUCCH and the PUSCH whose the resources are overlapped in the first slot may be configured such that the resources of the PUCCH and the PUSCH are overlapped with each other in a next slot.

The following is a more specific example of whether to perform slot-based hopping for PUCCH.

In the first scheme, whether to apply slot-based hopping to the new PUCCH format may be configured via an upper layer signal.

In the second scheme, the slot-based hopping for the new PUCCH format is configured according to whether the corresponding cell supports PUSCH hopping and whether the resource block RB for the corresponding PUCCH transmission is included in the PUSCH hopping region. For example, when the slot-based hopping for the PUSCH is not performed in the RB region for transmission of the new PUCCH format, slot-based hopping may not be performed for the new PUCCH format.

In the third scheme, whether or not to apply slot-based hopping to the new PUCCH format may be indicated using an indication field in the DCI corresponding to the PUCCH. In this case, the UE may or may not perform slot-based hopping for the PUCCH, as indicated via the hopping flag in the indication field. In addition, the slot-based hopping for the PUCCH may be performed when the RB region in which the PUCCH is transmitted corresponds to the PUSCH hopping region.

In the fourth scheme, whether to apply slot-based hopping to the new PUCCH format may be distinguished using PUCCH resources. In one example, some of the PUCCH resources indicate not to perform slot-based hopping, while others of the PUCCH resources indicate to perform slot-based hopping. Therefore, depending on which PUCCH resource is selected, it may be determined whether slot-based hopping is applied to the PUCCH. In this case, whether or not to apply slot-based hopping may be configured between the PUCCH resources by the upper layer in advance.

In the fifth scheme, depending on the number of PRBs constituting the PUCCH transmission, whether to perform slot-based hopping may or may not be configured differently. For example, in case of up to X PRBs, slot-based hopping is performed. In the case of PRBs exceeding X, slot-based hopping may not be performed. More specifically, the value of X may be 2, 4, or 6.

When slot-based hopping is configured to be disabled for the PUSCH-like format 1, OCC may be applied between DMRSs in two slots. In this case, depending on the combination of RB index, CS for the DMRS and corresponding OCC, the PUCCH resource may be distinguished/indexed. On the basis of this configuration, the base station may preconfigure a plurality of PUCCH resources having different combinations of RB index and DMRS CS/OCC. In this state, the base station may designate one of a plurality of corresponding PUCCH resources as a resource for ACK/NACK transmission of the UE via the ARI in DL grant DCI. Further, similarly, when slot-based hopping is configured to be disabled for the PUSCH-like format 2, OCC may be applied between DMRSs in two slots. Thus, depending on the combination of RB index, CS for the DMRS and corresponding OCC, the PUCCH resource may be distinguished/indexed. On the basis of this configuration, the base station may designate one of a plurality of corresponding PUCCH resources as a resource for ACK/NACK transmission of the UE via RRC/ARI.

On the other hand, the PUCCH resource for which slot-based hopping is enabled and the PUCCH resource for which slot-based hopping is disabled may be distinguished/indexed as different PUCCH resources. Further, based on this configuration, the base station pre-configures both the slot-based hopping enabled PUCCH resource and the slot-based hopping disabled PUCCH resource. In this state, the base station may use the ARI in DL grant DCI to indicate which of the slot-based hopping enabled PUCCH resource and the slot-based hopping disabled PUCCH resource may be used as resources for transmission of the ACK/NACK.

Additionally, the RE/RB mapping in PUCCH slot-based hopping may be achieved in accordance with the PUSCH hopping pattern. In this case, when a slot-based hopping flag for the PUCCH is introduced, the flag may be composed of a plurality of bits to include information on hopping therein.

III. Transmission Diversity Scheme for New PUCCH Format

In the next system, it may be considered to introduce a transmission diversity scheme (hereinafter referred to as TxD scheme) for the purpose of increasing the coverage or power saving of the UE when the UE transmits a new PUCCH format having a PUSCH format. The resource sharing scheme described above may also be applied to resource overlapping and sharing between multiple antenna ports AP for transmission diversity gain within a single UE. The followings are more specific examples of schemes for transmitting a PUCCH through multiple APs in a single UE.

In the first scheme, the PUCCH resources to be transmitted (for example, RB to be transmitted, DMRS sequence, CS/OCC combination, etc.) may be independently configured between the Aps. That is, in this case, the PUCCH resource may be distinguished based on the RB index or the DMRS sequence or the CS/OCC. The PUCCH resource for each AP may be represented by a PUCCH resource format. The PUCCH resource for the second AP may be implicitly determined from the PUCCH resource for the first AP (e.g., the resource may be an adjacent previous or next RB). In a scheme where PUCCH resources are independently configured between the APs and the configuration is notified, the RRC of the base station configures the PUCCH resource (RB resource and/or DMRS sequence information) for the plurality of APs, and the base station may inform the UE of the last selected PUCCH resource via the ARI in the DCI. More specifically, the base station may be only informing RB resources. Further, the above configuration may be limited to a case where the RB resources corresponding to the PUCCH resources for the APs are different from each other. In this case, the same mapping scheme may be applied to data transmitted through resources corresponding to each AP.

In the second scheme, the DMRS sequences may be configured independently of one another or differently between APs. More specifically, the base station may signal the UE about the CS for the DMRS via the DCI corresponding to the PUCCH for each AP. Alternatively, when DMRS CS/OCC is introduced, and if the TxD scheme is used, the base station may include information indicating the CS/OCC to be used for each AP or layer into the DCI corresponding to the HARQ-ACK to be transmitted through the PUCCH, and may transmit the information to the UE. In this connection, information about the CS/OCC to be used for each AP or layer may include all or some of Table 6. Alternatively, the RRC of the base station may configure the information indicating the CS/OCC for the DMRS for each AP or layer, and the base station may finally and selectively indicate the CS/OCC for the DMRS to be used for each AP in the PUCCH transmission via the ARI of the DCI. In this scheme, the PUCCH resource may be distinguished only based on the RB index. In this case, the same RE mapping may be applied to the data transmitted through the resources corresponding to each AP. In this scheme, the UE may perform precoding at least on a channel phase to prevent signals transmitted from each AP from being canceled out in the data region. Information about this may be signaled by the base station to the UE via RRC/MAC/DCI.

In order to allocate a plurality of PUCCH resources for TxD-based PUCCH transmission, the base station allocates a plurality of PUCCH resources having different combinations of the RB index and the CS for the DMRS (and/or OCC) as described in the above I Section and II Section to the plurality of Aps of the UE. Alternatively, the base station may allocate a plurality of PUCCH resources having the same RB index but different CSs for the DMRS (and/or different combinations of the CS for the DMRS and OCC) to the plurality of Aps of the UE.

When additional operations for multiplexing in the data region is not performed, transmission efficiency may be lowered due to interference or signal attenuation as for each AP or layer resource sharing scheme through the DMRS. When the limitation of the peak to average power ratio (PAPR) and the cubit metric (CM) of the UE is lowered, the introduction of a TxD scheme such as a space time block code (STBC) and a space frequency block code (SFBC) may be considered. The following are examples of the RE mapping method in the data region using this scheme.

Basically, the DMRS sequence transmitted through each AP may be considered to be distinguished by CS/OCC. It may be assumed that the RE mappings for the data region are different. For example, two coded modulation symbols, that is, $d(i1)$ and $d(i2)$ may be mapped differently to the two REs between the APs. For example, for AP #0, $d(i1)$ and $d(i2)$ may be mapped to two adjacent REs on the time axis or frequency axis. For AP #1, $Conj(-d(i2))$ and $Conj(d(i1))$ are mapped to two adjacent REs on the time axis or frequency axis (based on the same reference as AP #0). Here, $Conj(.)$ is a conjugate function. $Conj(a+j*b)=a-j*b$ for the complex number $a+j*b$. When the TxD scheme is applied as an STBC scheme, two REs per AP or layer may be adjacent on the time axis. For example, based on a PUSCH-like PUCCH format, first and second SC-FDMA symbols are bundled, third and fifth symbols are bundled, and sixth and seventh symbols are bundled in each slot. Further, when the TxD scheme is applied to the SFBC scheme, two REs per AP or layer may be adjacent on the frequency axis. Based on the PUSCH-like PUCCH format, the scheme bundles two consecutive subcarrier units within each slot.

When the number of SC-FDMA symbols (for coded symbol mapping) constituting the PUCCH in a slot or a subframe is an odd number, (assuming that the STBC or the SFBC is not applied to a last symbol of the corresponding slot or subframe), the last symbol of the corresponding slot or subframe is not subjected to any additional coding or symbol modification as described above, and, thus, the UE transmits the unmodified coded symbol through the plurality of Aps.

IV. Plurality of UCI Transmission Scheme

In the next system, it may be considered to transmit a plurality of UCIs through the new PUCCH format. In this connection, the plurality of UCIs may be different types of UCI, and may be, for example, HARQ-ACK and/or SR and/or periodic CSI reports. When the UE simultaneously transmits a plurality of UCIs through the new PUCCH format, UE may not distinguish between types of the UCIs, but UE may concatenate UCI information, (and may interleave the same if appropriate), and UE may apply ECC (error correcting code) such as tail-biting convolutional code (TBCC) to the concatenated information to generate coded bits. UE may perform rate matching and RE mapping for the coded bits. More specifically, interleaving allows a plurality of UCIs may to be interleaved with each other in an even manner. Alternatively, the interleaving may simply refer to ordering based on the UCI type. As a more concrete example, the HARQ-ACK may be located in the middle of the UCI. This is because the performance of the middle portion of the TBCC input may be robust even when the initial state/final state detection on the trellis diagram fails in the TBCC.

In another scheme, the UE may consider performing the encoding separately (i.e., performing separate coding) depending on the type of the UCI and thus performing the RE mapping differently. In the example, the UE performs coding separately the relative important first UCI (e.g., HARQ-ACK/SR) and the second UCI (for example, CSI) other than the first UCI. Further, UE may performs differently RE mapping with respect to corresponding coded bits/symbols. For example, First, for the first UCI (for example, HARQ-ACK and/or SR), UE may perform RE mapping with respect to the SC-FDMA symbol adjacent to the DMRS of the new PUCCH format. Then, with respect to the second UCI (for example, CSI), the UE may perform RE mapping of REs other than the REs to which the corresponding first UCI is mapped. More specifically, the number of REs for the first UCI may be pre-configured via the length of the first UCI or may be configured via an upper layer signal. The UE may map the encoded value from the symbol (the symbol itself or RE constituting the symbol) of the SC-FDMA adjacent to the DMRS using the configured value. When designating the SC-FDMA symbol on a RE basis, the UE is configured to first map the first UCI with respect to REs having a low (or high) frequency index in the first slot. In the second slot, the UE may be configured to symmetrically map the first UCI with respect to REs having the high (or low) frequency indexes. Thereafter, the UE performs RE mapping with respect to the coded symbols of the first UCI on a slot or subframe basis on a time domain. Next, RE mapping may be performed based on a frequency index (time-first mapping). More specifically, performing the RE mapping in the time-domain may include mapping the SC-FDMA symbol indexes in ascending order. The mapping may have interleaved form (for example, mapping is performed in order of 1, 4, 3, 2 when there are four regions on the time axis). Meanwhile, the first UCI may include HARQ-ACK/SR and RI, and the second UCI may include CQI/PMI. The RI may be CSI including RI. When there is no HARQ-ACK/SR, the first UCI may contain the RI and the second UCI may contain the CQI/PMI. Further, if there is no CQI/PMI, encoding and RE mapping may be performed after HARQ-ACK, SR and RI are included in the first UCI.

Even when the type of UCI varies, the present disclosure may be extended from the above scheme. In this case, the first UCI includes the SC-FDMA symbol adjacent to the DMRS, as in the above scheme, whereby the RE mapping with the first UCI is performed by UE. Subsequently, the second UCI may be to select a next adjacent SC-FDMA symbol to the DMRS, except for the region (RE or SC-FDMA symbol) to which the first UCI will be mapped. Thereafter, in the remaining regions, the coded symbol of the third UCI may be mapped to the RE. In this connection, the first UCI may include HARQ-ACK/SR, the second UCI may include RI, and the third UCI may include CQI/PMI. The RI may be CSI including RI.

The modulation orders used to transmit a plurality of UCIs concurrently transmitted on the same channel at the same time may be configured independently or separately. The plurality of UCIs or combinations thereof may be coded as separately. As an example, when the first UCI and the second UCI are coded separately, the first UCI may be transmitted in QPSK format, while the second UCI may be transmitted in 16 QAM format or in QPSK format in the same way as the first UCI. More specifically, the first UCI includes HARQ-ACK and/or SR, the second UCI may include CSI. Alternatively, the first UCI may include HARQ-ACK and/or SR and/or RI, and the second UCI may include CQI/PMI. More particularly, the HARQ-ACK and/or SR and RI in the first UCI in the second example may be coded separately. The RI report may include a CSI report concurrently transmitted with the RI or having the same priority as the RI. In the above description, QPSK and 16QAM are used merely as an example. The present disclosure is not limited thereto. Other modulation combinations (for example, 16QAM and 64QAM or a third modulation scheme) are also applicable.

When the second UCI is modulated in the 16 QAM, the QPSK symbol generation for the first UCI may be using the four outermost points among the 16QAM constellation points. As a more specific example, for the first UCI, a placeholder bit/repetition placeholder bit may be added to each bundle of coded bits or each coded bit. During scrambling, the bundle of coded bits or the coded bit may be mapped to one of the four outermost points among the constellation points.

The base station may inform the UE of the modulation information (whether to use QPSK or 16 QAM) for the second UCI using the DCI. More specifically, the DCI may be for downlink resource allocation. Further, the DCI corresponding to the downlink resource allocation may be for a secondary cell (SCell), that is, the scheduling cell may be a secondary cell. More specifically, in a scheme informing via DCI, a notification may be performed via ARI in the DCI, or via a format in which the DCI is bundled with a PUCCH resource. Alternatively, the DCI may be a third format that is not relevant to the uplink grant/downlink resource allocation. In this case, in case the UE misses the corresponding DCI without receiving the corresponding DCI, the basic setting may be considered, which may be transmitted in QPSK manner. In the case of the DCI scheme, the blind decoding (BD) of the UE or the overload of DCI may increase. Therefore, to mitigate this issue, the base station may signal the UE about the modulation information for the second UCI via the upper layer signal. More specifically, when the upper layer configures such that UE uses 16 QAM for the second UCI, the UE may always apply 16 QAM for the second UCI. However, based on the second UCI (and first UCI) state (e.g., UCI size), the UE may determine whether to use 16 QAM. The operation of the base station signaling the modulation information to the UE may include an operation of indicating modulation combination information for the first UCI and the second UCI. Further, according to the above schemes, when joint coding is used, or 16 QAM is permitted for the first UCI, information on whether to apply 16QAM or QPSK to all UCI including AN/SR may be notified.

According to this embodiment, the configuration of the modulation order for a plurality of UCIs may be extended to the transmission method. In the example, in the multi-antenna transmission environment of the UE, it may be contemplated that a transmission diversity scheme (the same information is transmitted through different APs) may be applied to the first UCI and a spatial multiplexing scheme (transmission of different information via different APs) may be applied to the second UCI. More specifically, for the first UCI and the second UCI being transmitted on the same channel at the same time, for the REs to which the first UCI is mapped, RE mapping may be carried out using the SFBC scheme or the STBC scheme described in the above section III. For the second UCI, the approach may be to transmit different/independent UCI between the APs. The scheme employing the plurality of transmission in the same channel is not limited to PUCCH transmission. Rather, the scheme may also be extended to PUSCH transmission (UCI feedback or aperiodic CSI without UL-SCH) or data transmission such as PDSCH transmission. Further, the transmission object may be extended to data as well as UCI.

V. Power Control Method

Power control for the PUSCH based PUCCH format may be based on a power control scheme for the PUSCH. In particular, it is possible to consider introducing a power control equation employing, as parameters, the size of UCI (including CRC) and the number of REs used for UCI transmission in PUCCH transmission. More specifically, the following equation may be introduced.

$$\Delta_{TF,c}(i) = 10 \log_{10}((2^{BPRE \cdot K_S} - 1) \cdot \beta_{offset}^{PUSCH})$$ [Equation 15]

In this connection, the BPRE may be expressed as a ratio between the bit size of the UCI and the number of REs used for UCI transmission purposes in the PUCCH. Further, $K_S$ and/or $\beta^{PUSCH}_{offset}$ value may be a value (e.g., 10) fixed in advance. In an alternative, $\beta^{PUSCH}_{offset}$ value may be configured by upper layer signaling. More specifically, $K_S$ and/or $\beta^{PUSCH}_{offset}$ values may be configured differently based on whether or not to apply slot-based hopping to the PUCCH. In the embodiment, when slot-based hopping is not performed, $K_S$ and/or $\beta^{PUSCH}_{offset}$ value may be configured in the same manner as the PUSCH. When performing slot-based hopping, the $K_S$ and/or $\beta^{PUSCH}_{offset}$ value may be configured differently from those in the PUSCH transmission. More specifically, the value of $K_S$ may be a value less than 1.25, which may be a value selected from This is due to the fact that the degree of power change may be reduced as the size of UCI changes due to the frequency diversity effect obtained by applying the slot-based hopping.

Figure 12A:
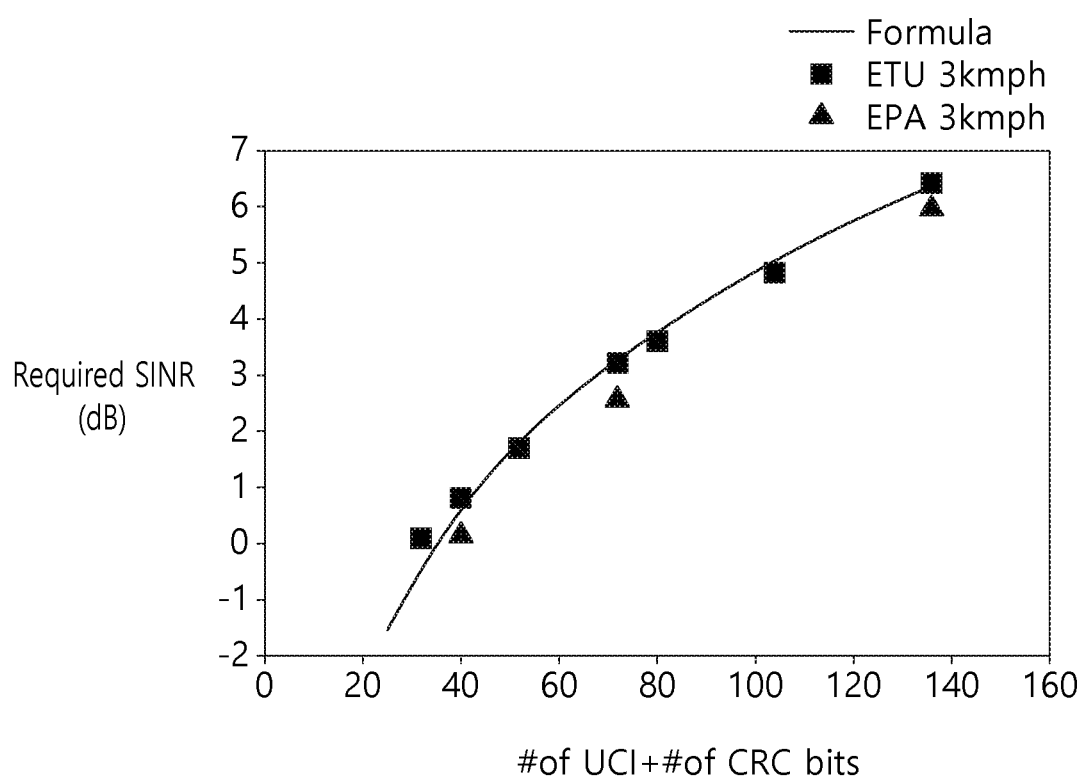
FIG. 12*a* shows comparison between the simulation results and the calculated results using the proposed mathematical expression for one PRB transmission.
Figure 12B:
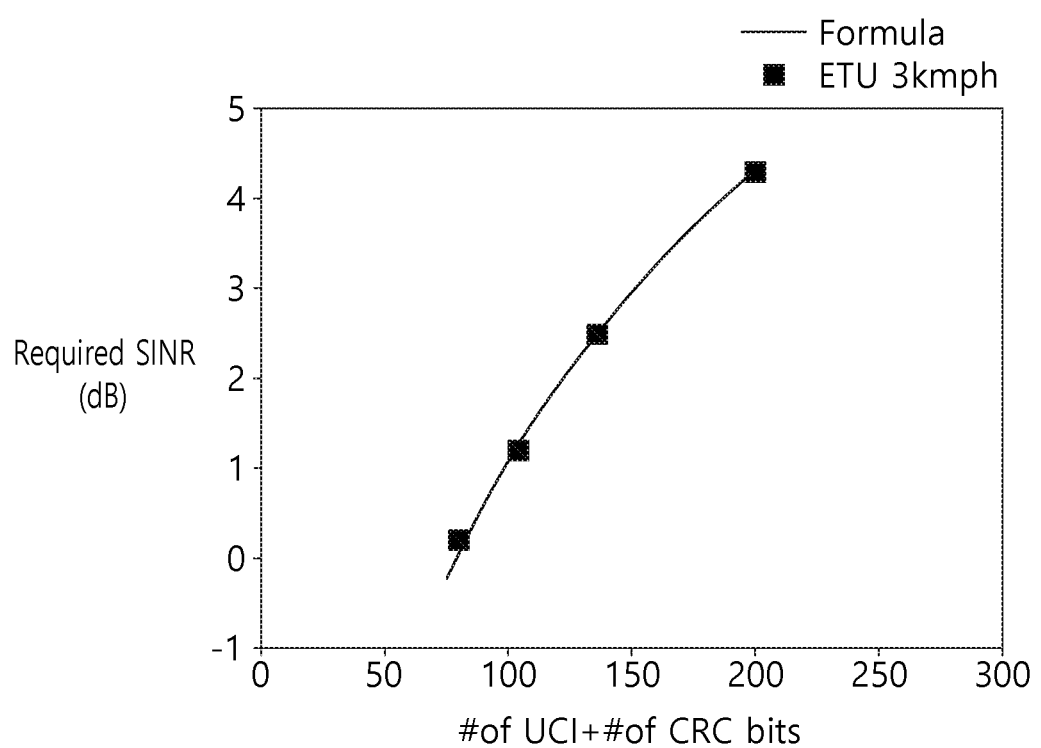
FIG. 12*b* shows comparison between the simulation result and the calculation result using the proposed mathematical expression for two PRB transmissions.

FIG. 12a shows comparison between the simulation results and the calculated results using the proposed mathematical expression for one PRB transmission. FIG. 12b shows comparison between the simulation result and the calculation result using the proposed mathematical expression for two PRB transmissions.

In FIG. 12a and FIG. 12b, the link-level simulation results and calculation results based on the proposed equation at 3 kmph in the ETU (Extended Typical Urban), EPA (Extended Pedestrian A) channel environment are shown. In this connection, the value of $K_S$ is 0.45. The size of the UCI (including the CRC) may be the size of the UCI configured (by subtracting the corresponding bit number in consideration of the DTX) based on the (E)PDCCH received by the UE. For example, when the base station transmits N PDSCHs and the UE receives N' (E) PDCCHs, the size of the UCI considered in power determination by the UE may be N' instead of N. Alternatively, the size of the UCI to be referenced in power control may be selected based on the codebook size as preconfigured, configured by the upper layer, or configured via DCI. For example, power control may be performed using the value of N. On the other hand, the above equation may be improved by adding additional offsets. The offset may be such that, for a particular UCI size, the value of ΔTF is zero or the ΔTR value is configured to be close to zero. The size of the specific UCI may be based on one, two, or six.

On the other hand, it may be indicated the corresponding DCI within the DCIs scheduling the downlink is transmitted in a which cell/subframe among all the cells/subframes. Alternatively, a total number of DCIs (or objects of HARQ-ACKs) including the current DCI as present in a previous time and/or cell index within a particular interval may be indicated (hereinafter referred to as counter DAI). In addition, the total number of cells/subframes subjected to downlink scheduling among all cells/subframes or the HARQ-ACK payload size to be transmitted through the PUCCH may be indicated by the DCI scheduling the downlink (Hereinafter, total DAI). The size (in particular, the HARQ-ACK payload size) of the UCI that may be considered in performing the power control of the PUCCH or the parameter (for example, nHARQ) value associated therewith may be computed based on the counter DAI value in the last received (E)PDCCH. Alternatively, considering the case in which the UE fails to detect/receive the last counter DAI transmitted by the base station, the size of the UCI (in particular, the HARQ-ACK payload size) that may be considered in performing the power control of the PUCCH, or the parameter (for example, nHARQ) associated therewith may be calculated based on the entire DAI value. That is, in the legacy PUCCH power control scheme (for example, PUCCH format 3), the codebook size for the HARQ-ACK may be computed based on the configured number of cells and the configured number of subframes (for example, M value). In this state, the value of nHARQ, which is a reference value for the UCI size at the time of power control may be the sum of the total number of transport blocks (TBs) received by the UE and the number of SPS release (E)PDCCHs (but in the case of TDD, the received counter DAI is used to compensate for the number of TBs for some lost DCI), and the sum may be smaller than the codebook size. On the other hand, when power control according to the new PUCCH format is performed (in particular, when the total DAI is indicated by DCI), the HARQ-ACK codebook size and the value of nHARQ, which is a reference value for UCI size in power control may be the same.

In the above description, it is assumed that the UCI size includes the number of CRC bits, but the present invention is not limited to this. The above description may be applied to cases where the UCI size does not include the number of CRC bits.

In performing the power control, the required transmission power level may be changed based on whether to apply the shortened PUCCH format or whether to apply the slot based hopping. Thus, the associated offset may be applied to the transmission power control. The offset may be pre-configured or configured by an upper layer signal.

The embodiments of the present disclosure described so far may be implemented using various means. For example, embodiments of the present disclosure may be implemented by hardware, firmware, software, or a combination thereof. More specifically, the description will be made with reference to the drawings.

Figure 13:
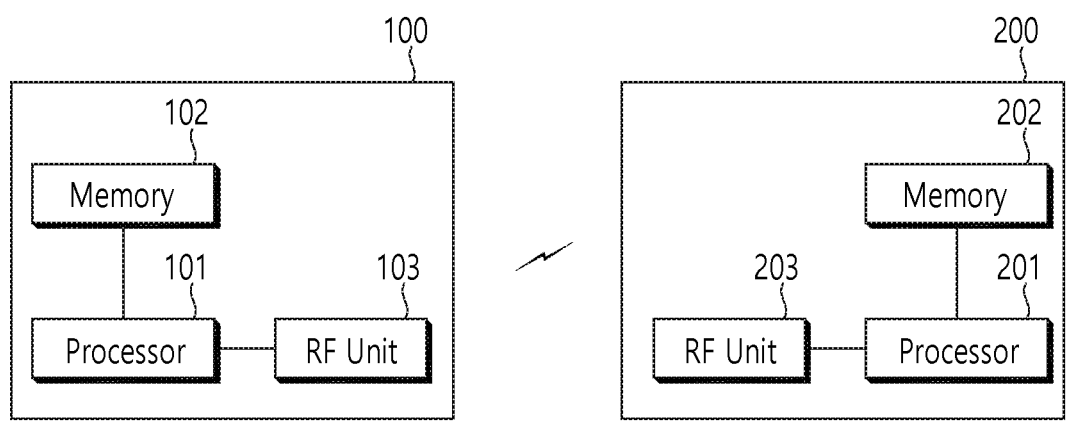
FIG. 13 is a block diagram illustrating a wireless communication system in which an embodiment of the present disclosure is implemented.

FIG. 13 is a block diagram of a radio communication system in which the embodiment of the present disclosure is implemented.

The base station 200 includes a processor 201, a memory 202, and an RF unit 203. The memory 202 is connected to the processor 201, and stores therein various information for driving the processor 201. The RF unit 203 is connected to the processor 201 to transmit and/or receive a radio signal. The processor 201 implements the proposed function, process and/or scheme. In the above-described embodiment, the operation of the base station may be implemented by the processor 201.

The MTC apparatus 100 includes a processor 101, a memory 102 and an RF unit 103. The memory 102 is connected to the processor 101 and stores therein various information for driving the processor 101. The RF unit 103 is connected to the processor 101 to transmit and/or receive a radio signal. The processor 101 implements the proposed function, procedure and/or scheme.

The processor may include an ASIC (application-specific integrated circuit), other chipset, logic circuit and/or data processing device. Memory may include ROM (read-only memory), RAM (random access memory), flash memory, memory cards, storage media and/or other storage devices. The RF unit may include a baseband circuit for processing radio signals. When the embodiment is implemented in software, the above-described scheme may be implemented by a module (process, a function, and the like) that performs the functions described above. The modules may be stored in memory and may be executed by the processor. Memory can be internal or external to the processor, and can be connected to the processor by a variety of well-known means.

Although in the exemplary system described above, the schemes are described on the basis of a flowchart as a series of steps or blocks, the present disclosure is not limited to the order of the steps, and some steps may be performed simultaneously or in a different order than the steps described above. Further, those skilled in the art will understand that the steps shown in the flowchart are not exclusive, that other steps may be included, or that one or more steps in the flowchart may be deleted without affecting the scope of the present disclosure.

What is claimed is:

1. A method for performing communication, the method performed by a base station and comprising:
    transmitting Physical Uplink Control Channel (PUCCH) configuration information for each of at least one PUCCH resource to a wireless communication device,
    wherein the PUCCH configuration information indicates whether frequency hopping is enabled or disabled for each PUCCH resource,
    wherein each PUCCH resource is associated with a respective one of a plurality of PUCCH formats,
    wherein each PUCCH resource is associated with a respective PUCCH resource index, and
    wherein the PUCCH configuration information is used to enable the wireless communication device to determine whether the frequency hopping is enabled or disabled for a PUCCH resource among the at least one PUCCH resource;
    based on frequency hopping being enabled for the PUCCH resource, receiving a PUCCH signal on the PUCCH resource with frequency hopping from the wireless communication device; and
    based on frequency hopping being disabled for the PUCCH resource, receiving the PUCCH signal on the PUCCH resource without frequency hopping from the wireless communication device.

2. The method of claim 1, wherein transmitting the PUCCH configuration information for each of the at least one PUCCH resource comprises:
    transmitting first PUCCH configuration information which indicates whether the frequency hopping is enabled or disabled for a first PUCCH resource, among the at least one PUCCH resource; and
    transmitting second PUCCH configuration information which indicates whether the frequency hopping is enabled or disabled for a second PUCCH resource, among the at least one PUCCH resource.

3. The method of claim 2,
    wherein based on the frequency hopping being enabled for the first PUCCH resource, a first PUCCH signal is received on the first PUCCH resource with frequency hopping; and
    wherein based on the frequency hopping being disabled for the second PUCCH resource, a second PUCCH signal is received on the second PUCCH resource without frequency hopping.

4. The method of claim 1, wherein the PUCCH signal includes at least one of (i) hybrid automatic repeat request (HARQ) ACK(Acknowledgement) information, (ii) a Scheduling request (SR), or (iii) Channel State Information (CSI).

5. The method of claim 1, wherein the frequency hopping is related to slot-based frequency hopping for the each PUCCH resource.

6. The method of claim 5, wherein the slot-based frequency hopping includes intra-slot frequency hopping.

7. The method of claim 1,
    wherein based on the PUCCH resource being associated with a first PUCCH format among the plurality of PUCCH formats: an orthogonal cover code (OCC) is configured for the PUCCH signal, and
    wherein based on the PUCCH resource being associated with a second PUCCH format among the plurality of PUCCH formats: an OCC is not configured for the PUCCH signal.

8. The method of claim 1,
    wherein each of the plurality of PUCCH formats configures a respective number of Orthogonal Frequency Division Multiplexing (OFDM) symbols for the PUCCH signal.

9. The method of claim 1,
    wherein each of the plurality of PUCCH formats configures a number of DMRS symbols per slot.

10. The method of claim 1,
    wherein each PUCCH resource is further associated with an index of a resource block (RB) for the PUCCH resource.

11. A base station configured to perform communication, the base station comprising:
    at least one transceiver;
    at least one processor; and
    at least one computer memory operably connected to the at least one processor and storing instructions that, based on being executed by the at least one processor, perform operations comprising:
    transmitting, via the at least one transceiver, Physical Uplink Control Channel (PUCCH) configuration information for each of at least one PUCCH resource to a wireless communication device,
    wherein the PUCCH configuration information indicates whether frequency hopping is enabled or disabled for each PUCCH resource,
    wherein each PUCCH resource is associated with a respective one of a plurality of PUCCH formats,
    wherein each PUCCH resource is associated with a respective PUCCH resource index, and
    wherein the PUCCH configuration information is used to enable the wireless communication device to determine whether the frequency hopping is enabled or disabled for a PUCCH resource among the at least one PUCCH resource;
    based on frequency hopping being enabled for the PUCCH resource, receiving, via the at least one transceiver, a PUCCH signal on the PUCCH resource with frequency hopping from the wireless communication device; and
    based on frequency hopping being disabled for the PUCCH resource, receiving, via the at least one transceiver, the PUCCH signal on the PUCCH resource without frequency hopping from the wireless communication device.

12. The base station of claim 11, wherein transmitting the PUCCH configuration information for each of the at least one PUCCH resource comprises:
    transmitting, via the at least one transceiver, first PUCCH configuration information which indicates whether the frequency hopping is enabled or disabled for a first PUCCH resource, among the at least one PUCCH resource; and
    transmitting, via the at least one transceiver, second PUCCH configuration information which indicates whether the frequency hopping is enabled or disabled for a second PUCCH resource, among the at least one PUCCH resource.

13. The base station of claim 12,
wherein based on the frequency hopping being enabled for the first PUCCH resource, a first PUCCH signal is received on the first PUCCH resource with frequency hopping; and
wherein based on the frequency hopping being disabled for the second PUCCH resource, a second PUCCH signal is received on the second PUCCH resource without frequency hopping.

14. The base station of claim 11, wherein the PUCCH signal includes at least one of (i) hybrid automatic repeat request (HARQ) ACK(Acknowledgement) information, (ii) a Scheduling request (SR), or (iii) Channel State Information(CSI).

15. The base station of claim 11, wherein the frequency hopping is related to slot-based frequency hopping for the each PUCCH resource.

16. The base station of claim 15, wherein the slot-based frequency hopping includes intra-slot frequency hopping.

17. The base station of claim 11,
wherein based on the PUCCH resource being associated with a first PUCCH format among the plurality of PUCCH formats: an orthogonal cover code (OCC) is configured for the PUCCH signal, and
wherein based on the PUCCH resource being associated with a second PUCCH format among the plurality of PUCCH formats: an OCC is not configured for the PUCCH signal.

18. The base station of claim 11,
wherein each of the plurality of PUCCH formats configures a respective number of Orthogonal Frequency Division Multiplexing (OFDM) symbols for the PUCCH signal.

19. The base station of claim 11, wherein each of the plurality of PUCCH formats configures a number of DMRS symbols per slot.

20. The base station of claim 11, wherein each PUCCH resource is further associated with an index of a resource block (RB) for the PUCCH resource.

* * * * *